(12) United States Patent
Miura

(10) Patent No.: US 12,484,349 B2
(45) Date of Patent: Nov. 25, 2025

(54) LIGHT-EMITTING DEVICE

(71) Applicant: NICHIA CORPORATION, Anan (JP)

(72) Inventor: Soichiro Miura, Tokushima (JP)

(73) Assignee: NICHIA CORPORATION, Anan (JP)

( * ) Notice: Subject to any disclaimer, the term of this patent is extended or adjusted under 35 U.S.C. 154(b) by 335 days.

(21) Appl. No.: 18/323,316

(22) Filed: May 24, 2023

(65) Prior Publication Data

US 2023/0387360 A1    Nov. 30, 2023

(30) Foreign Application Priority Data

May 26, 2022 (JP) ................................ 2022-086305
May 26, 2022 (JP) ................................ 2022-086306

(51) Int. Cl.
| | |
|---|---|
| *H10H 20/851* | (2025.01) |
| *F21S 41/16* | (2018.01) |
| *F21S 41/176* | (2018.01) |
| *H01L 25/16* | (2023.01) |
| *H01S 5/00* | (2006.01) |

(Continued)

(52) U.S. Cl.
CPC .... *H10H 20/8514* (2025.01); *H10H 20/8506* (2025.01)

(58) Field of Classification Search
CPC ........... F21S 41/16; F21S 41/176; F21K 9/64; F21V 9/30; H10H 20/8515; H10H 20/8506; H01S 5/32341; H01S 5/4031; H01S 5/0087
See application file for complete search history.

(56) References Cited

U.S. PATENT DOCUMENTS

2010/0246159 A1   9/2010   Wada
2010/0266241 A1   10/2010  Hosoda
(Continued)

FOREIGN PATENT DOCUMENTS

DE    202022104777 U1   4/2023
EP    2757599 A1        7/2014
(Continued)

OTHER PUBLICATIONS

Non Final Office Action in the related U.S. Appl. No. 18/323,335, dated Sep. 19, 2025.

*Primary Examiner* — Antonio B Crite
(74) *Attorney, Agent, or Firm* — Global IP Counselors, LLP

(57) ABSTRACT

A light-emitting device includes a base member, light-emitting element, and a wavelength conversion member. Light-emitting element is configured to emit light traveling in a lateral direction. The wavelength conversion member is disposed at a lateral side of the light-emitting element. The wavelength conversion member includes a wavelength conversion portion and a surrounding portion. The wavelength conversion portion having an incident lateral surface and an exit surface so that light is incident on the incident lateral surface, undergoes wavelength conversion in the wavelength conversion portion, and exits through the exit surface. The surrounding portion includes a protrusion located above the light-emitting element, and protruding outwardly toward a light-emitting element side with respect to the incident lateral surface with the protrusion overlapping with the emission end surface of the light-emitting element in a top view.

15 Claims, 24 Drawing Sheets

(51) Int. Cl.
*H01S 5/02257* (2021.01)
*H01S 5/02315* (2021.01)
*H01S 5/02326* (2021.01)
*H01S 5/0239* (2021.01)
*H01S 5/323* (2006.01)
*H10H 20/85* (2025.01)

(56) References Cited

U.S. PATENT DOCUMENTS

| | | |
|---|---|---|
| 2013/0329397 A1 | 12/2013 | Shimizu et al. |
| 2016/0268770 A1 | 9/2016 | Tazawa et al. |
| 2016/0285233 A1 | 9/2016 | Victoria et al. |
| 2017/0256685 A1 | 9/2017 | Schug |
| 2017/0314768 A1 | 11/2017 | Kiyota et al. |
| 2017/0317469 A1 | 11/2017 | Kiyota |
| 2018/0087726 A1* | 3/2018 | Yamashita ......... H01S 5/02255 |
| 2018/0217321 A1 | 8/2018 | Matsumoto |
| 2020/0227890 A1 | 7/2020 | Chen et al. |
| 2020/0264500 A1 | 8/2020 | Kozuru |
| 2022/0376462 A1 | 11/2022 | Heikman |
| 2023/0033309 A1 | 2/2023 | Takigawa et al. |

FOREIGN PATENT DOCUMENTS

| | | |
|---|---|---|
| JP | 2010-251588 A | 11/2010 |
| JP | 2010-251686 A | 11/2010 |
| JP | 2011-171504 A | 9/2011 |
| JP | 2013-254889 A | 12/2013 |
| JP | 2016-167492 A | 9/2016 |
| JP | 2017-199849 A | 11/2017 |
| JP | 2017-199850 A | 11/2017 |
| JP | 2017-201688 A | 11/2017 |
| JP | 2018-056160 A | 4/2018 |
| JP | 2018-512745 A | 5/2018 |
| JP | 2019-204890 A | 11/2019 |
| JP | 2020-038271 A | 3/2020 |
| JP | 2020-181891 A | 11/2020 |
| JP | 3228571 U | 11/2020 |
| WO | 2010067291 A1 | 6/2010 |
| WO | 2021085164 A1 | 5/2021 |
| WO | 2021166511 A1 | 8/2021 |

* cited by examiner

LIGHT-EMITTING DEVICE

CROSS REFERENCE TO RELATED APPLICATIONS

This application claims priority to Japanese Patent Application No. 2022-086305, filed on May 26, 2022, and Japanese Patent Application No. 2022-086306, filed on May 26, 2022, the entire disclosures of which are hereby incorporated herein by reference.

BACKGROUND

1. Field of the Invention

The present disclosure relates to a light-emitting device.

2. Description of Related Art

Japanese Unexamined Patent Application Publication No. 2017-199850 discloses a light-emitting device including a semiconductor laser element as a light-emitting element in which a laser light emitted from the semiconductor laser element is reflected by a reflective member, incident on a wavelength conversion member, and converted by a wavelength conversion portion to have a different wavelength. The wavelength-converted light passes through a through hole of a holding member and a light-transmissive member and is emitted to the outside. For example, the holding member also functions as a light-shielding member when the optical path of the laser light is misaligned.

SUMMARY

In the case in which not the entirety of light but a desired portion of light emitted from the light-emitting element is used as the emitting light, it is preferable to inhibit the portion of light not used as the emitting light from affecting the emitting light.

A light-emitting device according to one embodiment of the present disclosure includes a base member, a light-emitting element, and a wavelength conversion member. The light-emitting element are disposed on or above an upper surface of the base member and configured to emit light traveling in a lateral direction. The wavelength conversion member is disposed on or above the upper surface of the base member at a lateral side of the light-emitting element. The wavelength conversion member includes a wavelength conversion portion and a surrounding portion. The wavelength conversion portion has an incident lateral surface and an exit surface so that light emitted from an emission end surface of the light-emitting element and traveling in the lateral direction is incident on the incident lateral surface, undergoes wavelength conversion in the wavelength conversion portion, and exits through the exit surface. The surrounding portion is disposed around the wavelength conversion portion. The surrounding portion includes a protrusion located above the light-emitting elements. The protrusion protrudes outwardly toward a light-emitting element side with respect to the incident lateral surface of the wavelength conversion portion with the protrusion overlapping with the emission end surface of the light-emitting element in a top view.

A light-emitting device according to another embodiment of the present disclosure includes a base member, a light-emitting element, a wavelength conversion member, and a light-transmissive member. The light-emitting element are disposed on or above an upper surface of the base member and configured to emit light traveling in a lateral direction. The wavelength conversion member is disposed on or above the upper surface of the base member at a lateral side of the light-emitting element. The wavelength conversion member includes a wavelength conversion portion and a surrounding portion. The wavelength conversion portion has an incident lateral surface and an exit surface so that light emitted from an emission end surface of the light-emitting element and traveling in the lateral direction is incident on the incident lateral surface, and exits through the exit surface. The surrounding portion is disposed around the wavelength conversion portion. The surrounding portion includes a protrusion located above the light-emitting element. The protrusion protrudes outwardly toward a light-emitting element side with respect to the incident lateral surface of the wavelength conversion portion. The light-transmissive member is disposed above the wavelength conversion member. The light-transmissive member has a light-shielding region provided with a light-shielding film, and a light-transmissive region not provided with the light-shielding film. The light-shielding film is located at a position through which a virtual line passes. The virtual line connects an upper end of the emission end surface of the light-emitting element and an upper end of a lateral surface of the protrusion of the surrounding portion of the wavelength conversion member located closer to the light-emitting element than other lateral surfaces of the protrusion.

According to the embodiments of the present disclosure, a light-emitting device can be provided in which a portion of light not used as the emitting light is inhibited from affecting the emitting light.

DETAILED DESCRIPTION

Figure 1:
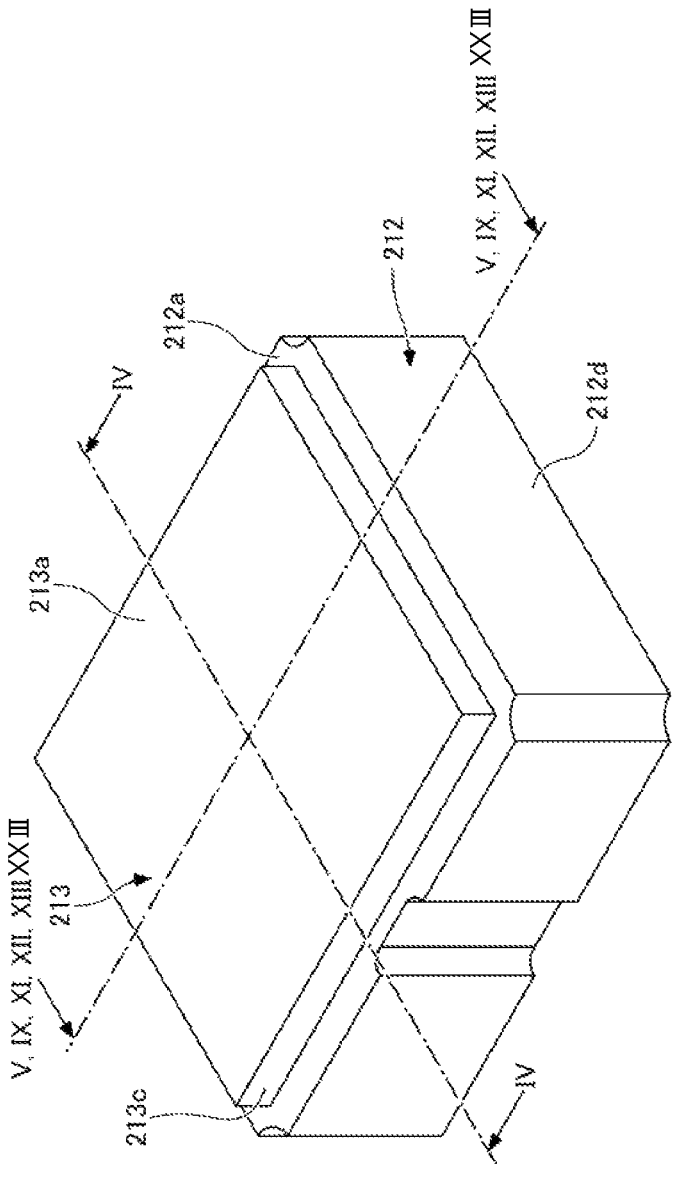
FIG. 1 is a schematic perspective view of a light-emitting device according to a first embodiment and a fourth embodiment.

Certain embodiments of the present invention will be described below with reference to the accompanying drawings. The description below includes terms indicating specific directions or positions (such as "up," "down," and other terms containing these terms) as appropriate. These terms are used to facilitate understanding of the present invention referring to the drawings, and the meanings of these terms do not excessively limit the technical scope of the present disclosure. For example, the expression "upper surface" does not indicate that the invention must be used such that the surface always faces upward. A portion with the same reference numeral in a plurality of drawings represents the same or equivalent portion or member.

In the present disclosure, as for polygonal shapes such as triangular shapes and quadrangular shapes, polygonal shapes with rounded corners, beveled corners, angled corners, reverse-rounded corners are also referred to as polygonal shapes. Likewise, not only shapes with such modification at corners (end of sides) but also shapes with modifications at intermediate portions of sides of the shapes are also referred to as polygons. That is, shapes based on polygonal shapes with partial modification are also interpreted as "polygons" in the present disclosure.

Such interpretation is applied not only to polygonal shapes but also applies to terms denoting specific shapes such as trapezoids, circles, protrusions, and recesses. The same applies to sides forming such shapes. That is, even if an end or an intermediate portion of a side is modified, the modified portion is interpreted as a portion of a "side." When "polygonal shapes" and "sides" without such modified portions are intended to be distinguished from those with modifications, the term "exact" is added, such as an "exact quadrangular shape."

In the embodiments described below, examples of light-emitting devices and the like are described to give concrete form to the technical idea of the present invention, and the present invention is not limited to the description below. Unless otherwise specified, sizes, materials, shapes, and relative positions of constituent components described below are not intended to limit the scope of the present invention thereto but rather are described as examples. Constitutions described in one embodiment may be applicable to other embodiments and modifications. Sizes or positional relationships of members illustrated in the drawings may be exaggerated in order to clarify the descriptions. A schematic diagram in which illustration of components is partially omitted may be used, and an end view showing only a cross section of a member may be used as a cross-sectional view in order to prevent the drawings from being too complicated.

First Embodiment

A light-emitting device of a first embodiment includes one or more light-emitting elements, a wavelength conversion member, and a base member on which the one or more light-emitting elements and the wavelength conversion member are disposed. An example of the structure of a light-emitting device 200 according to the first embodiment is described with reference to FIG. 1 to FIG. 10.

Figure 2:
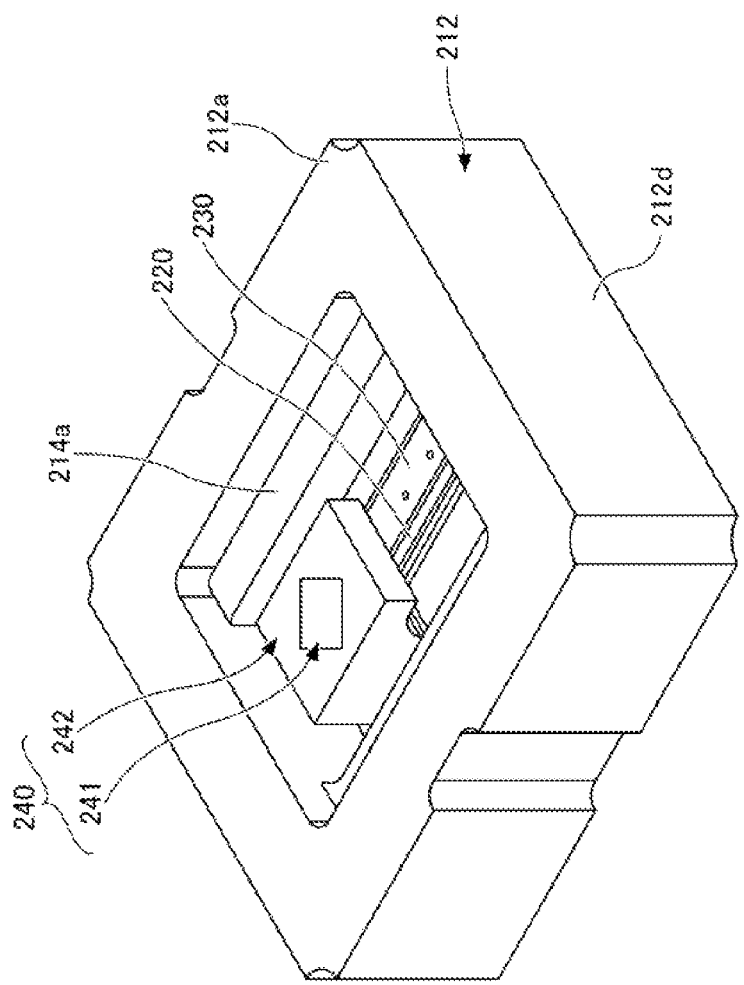
FIG. 2 is a schematic perspective view of the light-emitting device according to the first embodiment shown in FIG. 1 without a cover.
Figure 3:
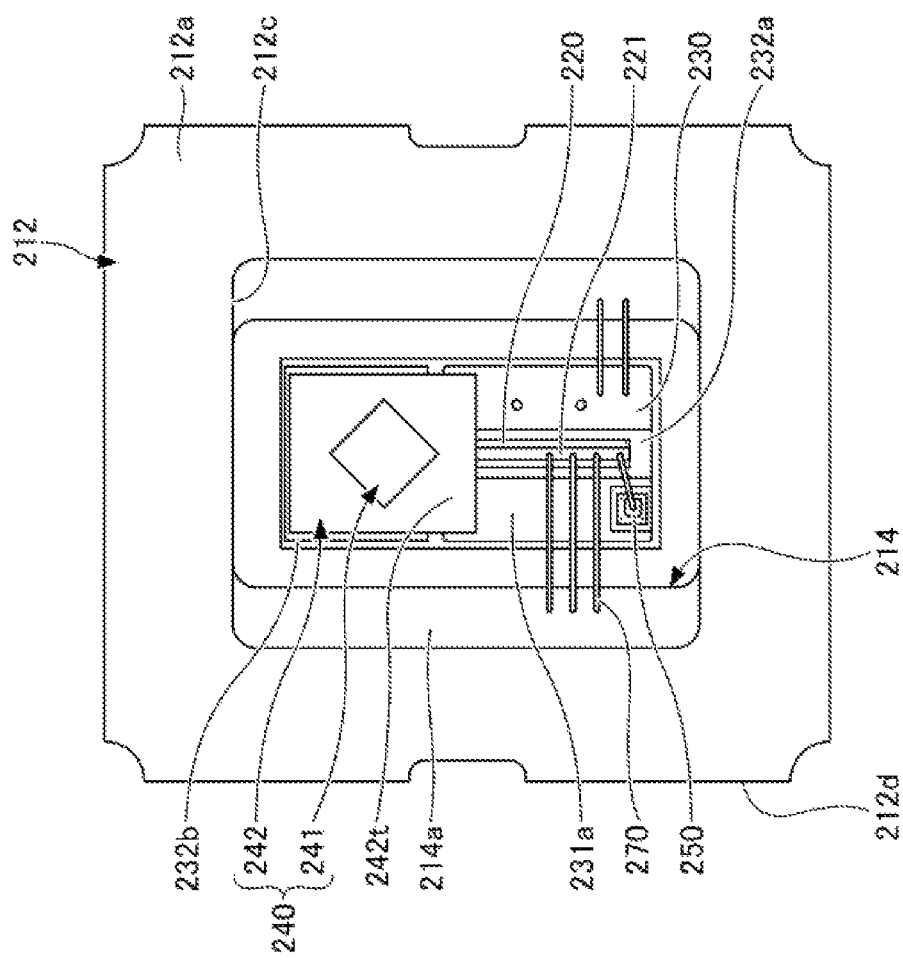
FIG. 3 is a schematic top view of the light-emitting device shown in FIG. 2.
Figure 4:
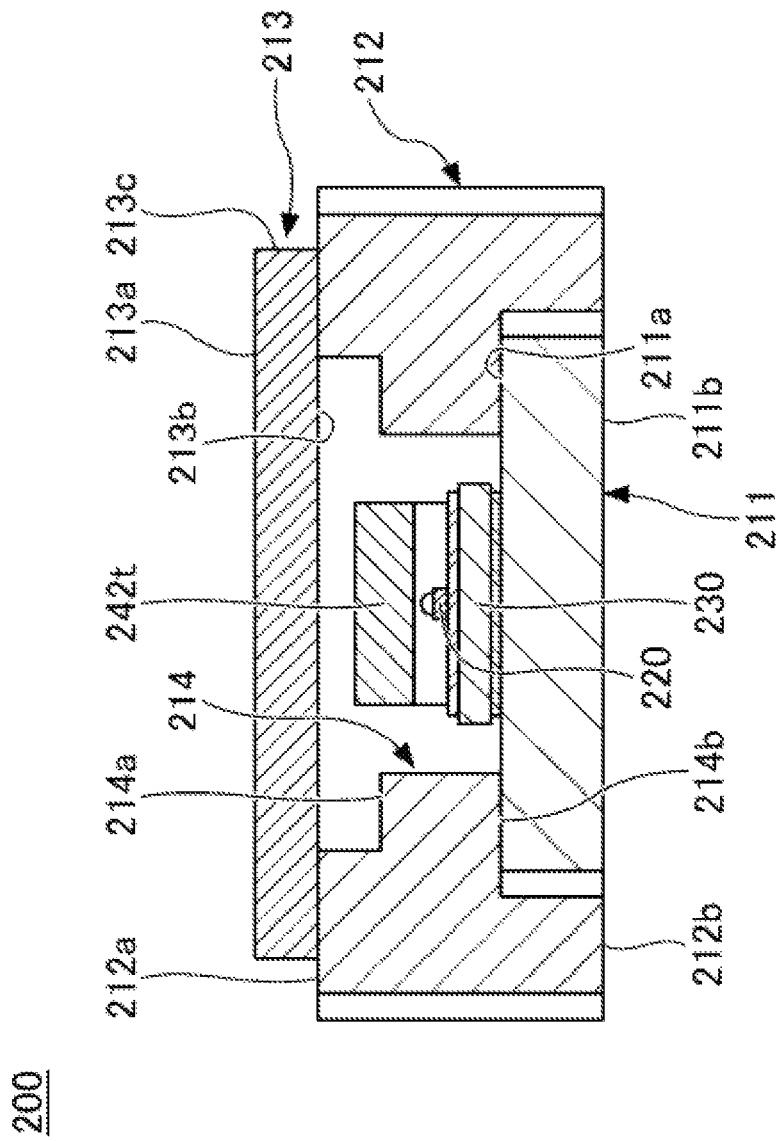
FIG. 4 is a schematic cross-sectional view of the light-emitting device according to the first embodiment taken along the cutting-plane line IV-IV of FIG. 1.
Figure 5:
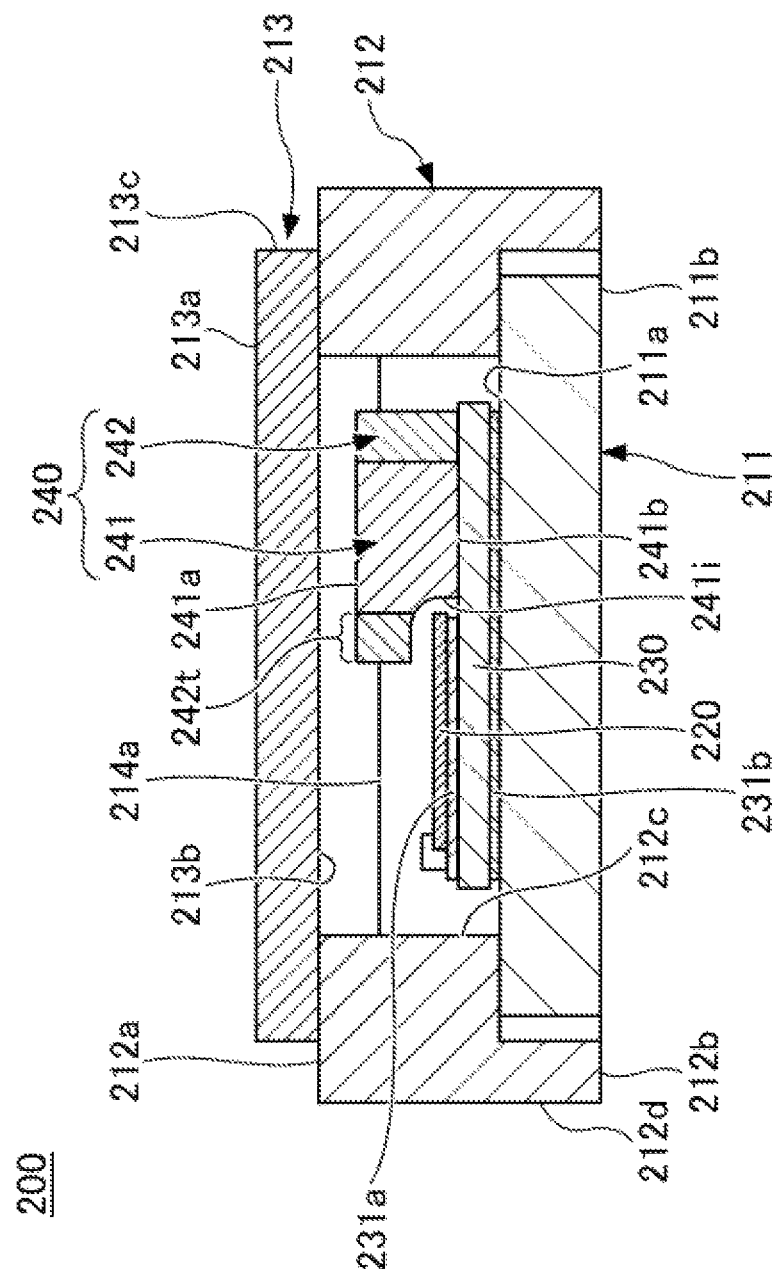
FIG. 5 is a schematic cross-sectional view of the light-emitting device according to the first embodiment taken along the cutting-plane line V-V of FIG. 1.
Figure 6:
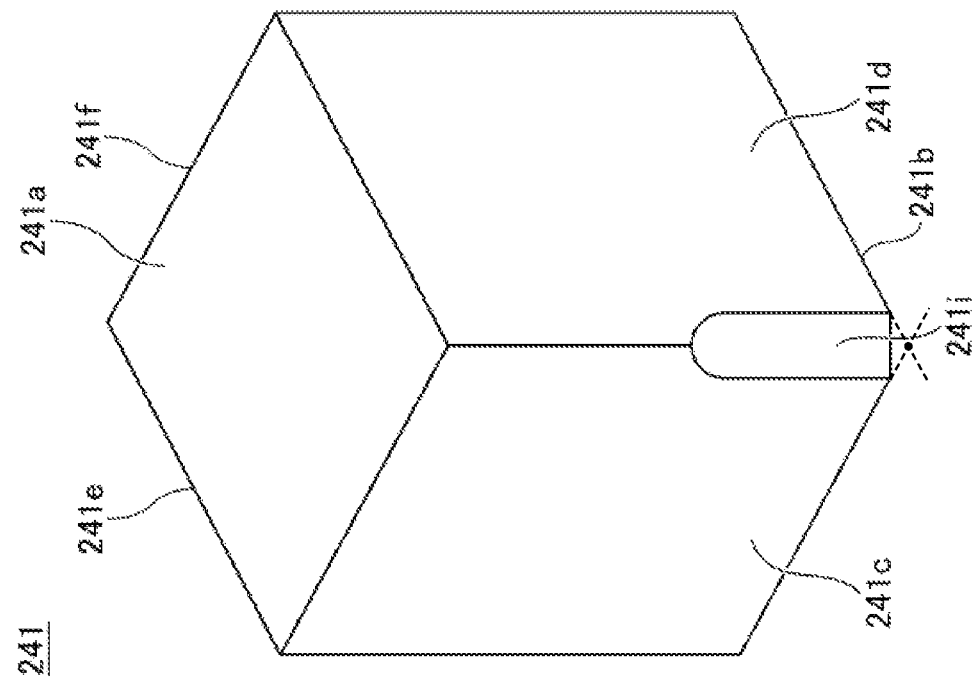
FIG. 6 is a schematic perspective view of an example of the structure of a wavelength conversion portion according to the present disclosure.
Figure 7:
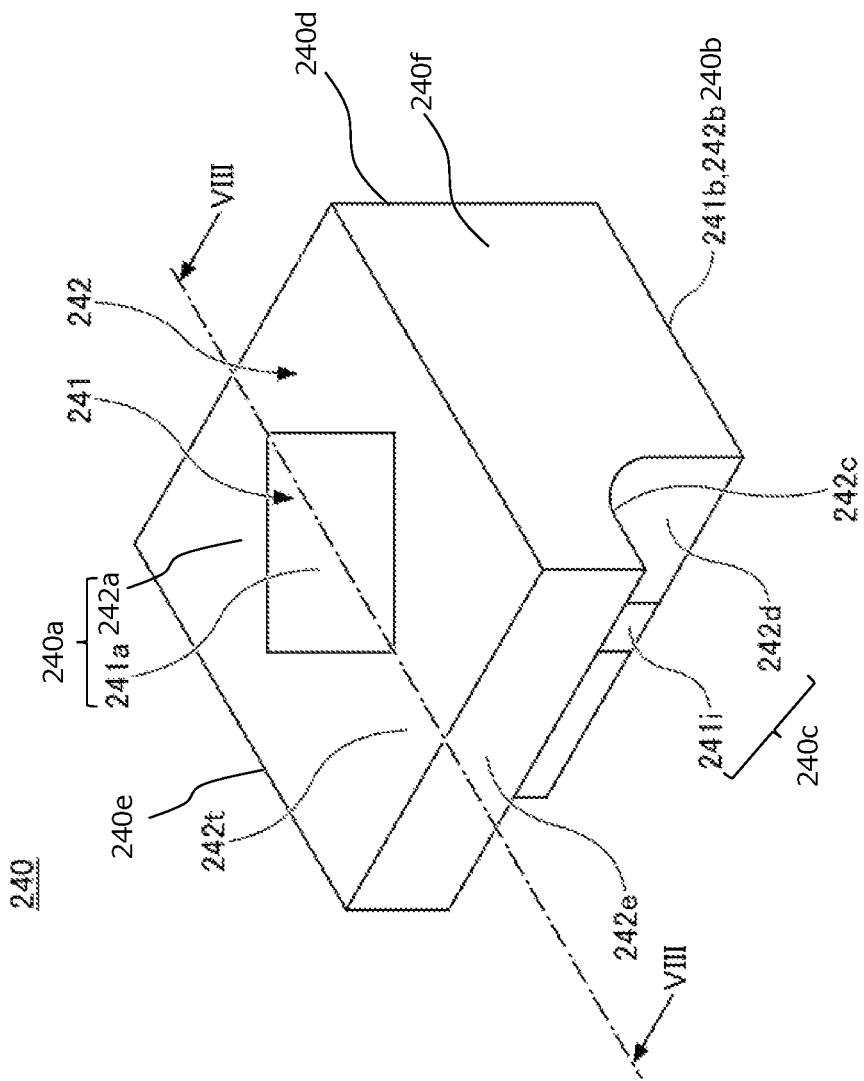
FIG. 7 is a schematic perspective view of an example of the structure of a wavelength conversion member according to the present disclosure.
Figure 8:
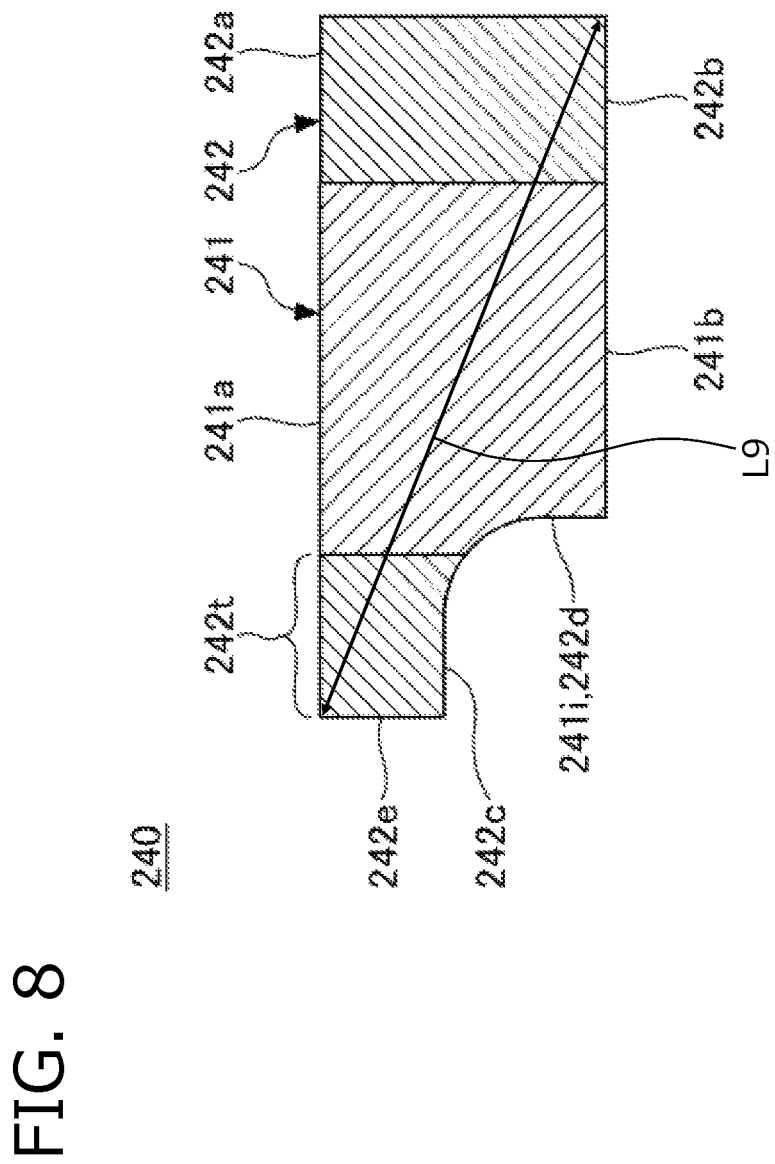
FIG. 8 is a schematic cross-sectional view of the wavelength conversion member taken along the cutting-plane line VIII-VIII of FIG. 7.
Figure 9:
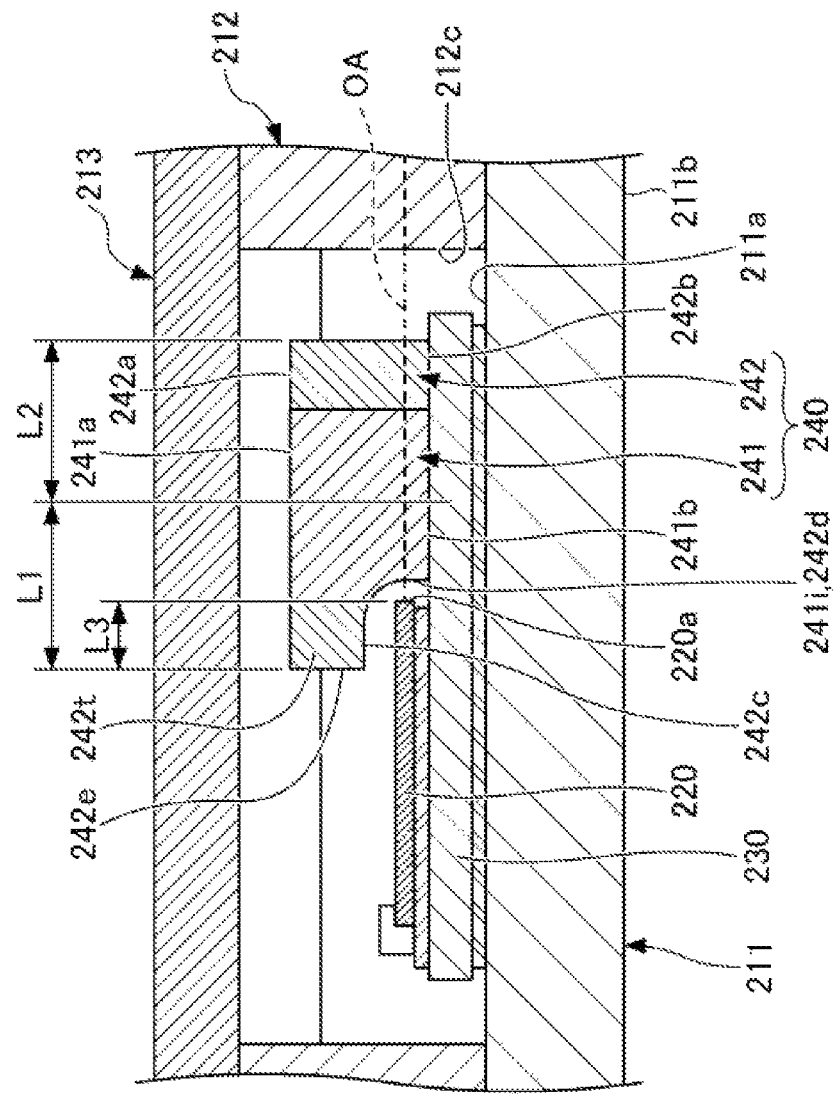
FIG. 9 is a schematic enlarged cross-sectional view of a light-emitting element, the wavelength conversion member, and the vicinity thereof in the light-emitting device shown in FIG. 5.
Figure 10:
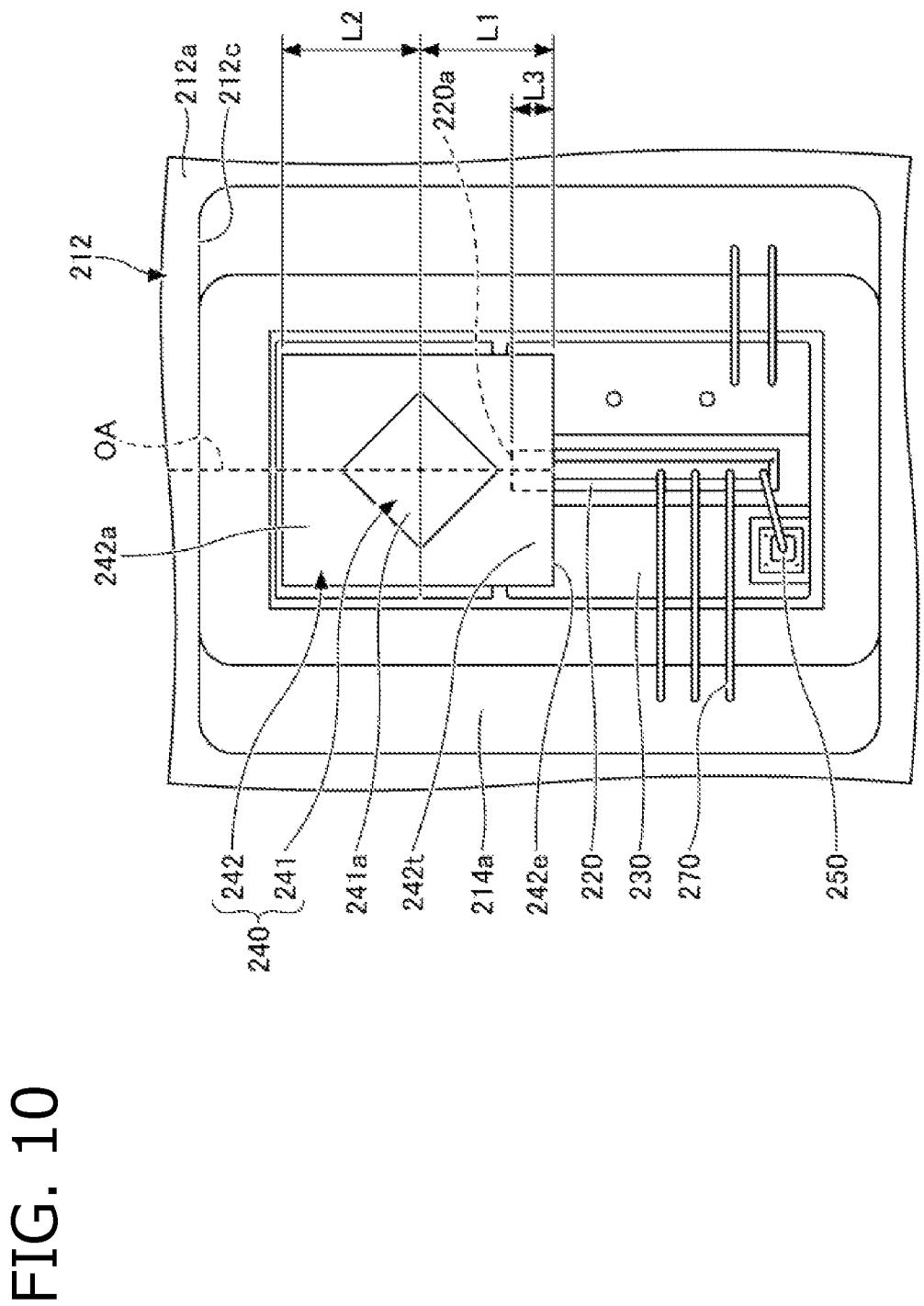
FIG. 10 is a schematic enlarged top view of the light-emitting element, the wavelength conversion member, and the vicinity thereof in the light-emitting device shown in FIG. 3.

FIG. 1 is a schematic perspective view illustrating the light-emitting device 200 according to the first embodiment. FIG. 2 is a schematic perspective view of the light-emitting device 200 shown in FIG. 1 without a cover 213. In the schematic perspective view of FIG. 2, a metal film 221 and wirings 270 disposed on the upper surface of a light-emitting element 220 are omitted for convenience of description. FIG. 3 is a schematic top view of the light-emitting device 200 shown in FIG. 2. FIG. 4 is a schematic cross-sectional view of the light-emitting device 200 taken along the cutting-plane line IV-IV of FIG. 1. FIG. 5 is a schematic cross-sectional view of the light-emitting device 200 taken along the cutting-plane line V-V of FIG. 1. The metal film 221 disposed on the upper surface of the light-emitting element 220 and a first metal film 232a, a second metal film 232b, and the wirings 270 disposed on the upper surface of a submount 230 are omitted for convenience of description. FIG. 6 is a schematic perspective view of a wavelength conversion portion 241 according to the present disclosure. FIG. 7 is a schematic perspective view of a wavelength conversion member 240 according to the present disclosure. FIG. 8 is a schematic cross-sectional view of the wavelength conversion member 240 taken along the cutting-plane line VIII-VIII of FIG. 7. FIG. 9 is a schematic enlarged cross-sectional view of the light-emitting element 220, the wavelength conversion member 240, and the vicinity in the light-emitting device 200 shown in FIG. 5. The metal film 221 disposed on the upper surface of the light-emitting element 220 and the first metal film 232a, the second metal film 232b, and the wirings 270 disposed on the upper surface of the submount 230 are omitted for convenience of description. FIG. 10 is a schematic enlarged top view of the light-emitting element 220, the wavelength conversion member 240, and the vicinity in the light-emitting device 200 shown in FIG. 3.

The light-emitting device 200 according to the present embodiment includes a base member 211, one or more light-emitting elements 220, and the wavelength conversion member 240. In the example shown in the drawings, the light-emitting device 200 further includes a frame member 212, the cover 213, the submount 230, a protective element 250, and the wirings 270. The light-emitting device 200 does not necessarily include all of these components.

Components of the light-emitting device 200 will be described below.

Base Member 211

The base member 211 has an upper surface 211a and a lower surface 211b. The base member 211 has a rectangular outer shape in a top view. This rectangular shape may be a rectangular shape having long sides and short sides. The base member 211 does not necessarily have a rectangular outer shape in a top view. The rectangular shape may include a square shape unless exclusion of a square shape is mentioned otherwise.

For example, the base member 211 can be formed of a metal as a main material. Examples of the metal to be used include copper and copper alloys. The base member 211 may be formed of a main material other than metals, such as a ceramic.

Frame Member 212

The frame member 212 has an upper surface 212a, a lower surface 212b, one or more inner lateral surfaces 212c, and one or more outer lateral surfaces 212d. For example, the frame member 212 has a rectangular frame shape in a top view. The one or more inner lateral surfaces 212c of the frame member 212 meet the upper surface 212a and extend downward from the upper surface 212a. The one or more outer lateral surfaces 212d of the frame member 212 meet the upper surface 212a and the lower surface 212b of the frame member 212.

The frame member 212 may further include a stepped portion 214 having an upper surface 214a located above the upper surface 211a of the base member 211 and below the upper surface 212a of the frame member 212. The stepped portion 214 further has an inner lateral surface meeting the upper surface 214a and extending downward. The upper surface 214a meets one or more inner lateral surfaces 212c of the frame member 212. For example, the upper surface 214a can be parallel to the upper surface 211a of the base member 211. For example, the inner lateral surface of the stepped portion 214 meets the upper surface 211a of the base member 211. In the example shown in the drawings, stepped portions 214 are respectively provided along two opposite inner lateral surfaces 212c in a top view. The stepped portion 214 may be provided along one inner lateral surface 212c. The frame member 212 does not necessarily include the stepped portion 214.

The upper surface 214a of the stepped portion 214 may be provided with one or more metal films. Further, the lower surface 211b of the base member 211 and/or the lower surface 212b of the frame member 212 may be provided with one or more metal films. The one or more metal films disposed on the upper surface 214a of the stepped portion 214 can be electrically connected to the metal films disposed on the lower surface 211b and/or the lower surface 212b through, for example, a via. For example, Ni/Au (metal films layered in the order of Ni and Au) or Ti/Pt/Au (metal films layered in the order of Ti, Pt, and Au) may be used for the metal films.

The stepped portion 214 can further has a lower surface 214b meeting the inner lateral surface of the stepped portion 214.

The lower surface 214b can be a surface parallel to the upper surface 214a. The lower surface 214b is located above the lower surface 212b of the frame member 212. The lower surface 214b of the stepped portion 214 is bonded to the upper surface 211a of the base member 211. In the example shown in the drawings, the frame member 212 further has a lateral surface meeting the lower surface 214b and extending downward. The lateral surface meets the lower surface 212b of the frame member 212. The lateral surface can be in contact with a lateral surface of the base member 211.

The base member 211 and the frame member 212 define a recessed shape depressed in a direction from the upper surface 212a of the frame member 212 to the upper surface 211a of the base member 211. The recessed shape is formed at a location inward of the outer periphery of the frame member 212 in a top view. The upper surface 211a of the base member 211 is surrounded by a frame constituted of the one or more inner lateral surfaces 212c of the frame member 212 or/and the inner lateral surface of the stepped portion 214 in a top view. The outer shape of this frame is a rectangular shape having long sides and short sides. In the example shown in the drawings, the base member 211 and the frame member 212 are separately formed and bonded together. The base member 211 and the frame member 212 may be integrally formed.

This case will be described as a modified example.

For example, the frame member 212 can be formed of a material different from the material of the base member 211 as a main material. Examples of the main material constituting the frame member 212 include ceramics. Examples of the ceramics to be used include aluminum nitride, silicon nitride, aluminum oxide, and silicon carbide.

Cover 213

The cover 213 has an upper surface 213a, a lower surface 213b, and one or more lateral surfaces 213c meeting the upper surface 213a and the lower surface 213b. The one or more lateral surfaces 213c connect the outer edges of the upper surface 213a and the outer edges of the lower surface 213b. For example, the cover 213 has a rectangular parallelepiped or cubic shape. In this case, the upper surface 213a and the lower surface 213b of the cover 213 both have a rectangular shape, and the cover 213 has four rectangular lateral surfaces 213c.

The cover 213 is not limited to a rectangular parallelepiped or cubic shape. That is, the cover 213 is not limited to a rectangular shape in a top view but may have any shape such as circles, ellipses, and polygons.

The cover 213 is supported by the frame member 212. The cover 213 is disposed above the upper surface 211a of the base member 211. For example, the outer peripheral portion of the lower surface 213b of the cover 213 is bonded to the upper surface 212a of the frame member 212. By bonding the cover 213 to the frame member 212, a sealed space surrounded by the base member 211, the frame member 212, and the cover 213 is defined.

The cover 213 has a light-transmissive region that transmits light with a predetermined wavelength. The light-transmissive region constitutes at least a portion of the upper surface 213a and the lower surface 213b of the cover 213. For example, the light-transmissive region of the cover 213 can be formed of sapphire as a main material. Sapphire is a material having a comparatively high transmittance and comparatively high strength. For the main material of the light-transmissive region of the cover 213, a material other than sapphire, such as light-transmissive materials including quartz, silicon carbide, glass, or the like may be used. A portion other than the light-transmissive region of the cover 213 may be formed integrally with the light-transmissive region using the same material as the material of the light-transmissive region.

Light-Emitting Element 220

In the example of the light-emitting device 200 shown in the drawings, a single light-emitting element 220 is mounted. A plurality of light-emitting elements may be mounted in the light-emitting device 200. For example, the light-emitting element 220 is a semiconductor laser element. The light-emitting element 220 is not limited to a semiconductor laser element but may be, for example, a light-emitting diode (LED) or an organic light-emitting diode (OLED). In the light-emitting device 200 illustrated in FIG. 1 to FIG. 5, FIG. 9, and FIG. 10, a semiconductor laser element is employed as the light-emitting element 220.

For example, the light-emitting element 220 has an elongated rectangular outer shape in a top view. A lateral surface meeting one of two short sides of the elongated rectangular shape serves as an emission end surface of light emitted from the light-emitting element 220. The upper surface and the lower surface of the light-emitting element 220 have larger areas than the area of the emission end surface.

A metal film 221 may be disposed on the upper surface of the light-emitting element 220. For example, the metal film 221 is provided with a wiring or the like for electrical connection to another member. In the example shown in the drawings, the metal film 221 disposed on the upper surface of the light-emitting element 220 is not disposed over the entirety of the upper surface of the light-emitting element 220. The metal film 221 extends in the long side direction of the upper surface of the light-emitting element 220. The upper surface of the light-emitting element 220 is not necessarily provided with the metal film 221.

The case in which the light-emitting element 220 is a semiconductor laser element will be described below.
Light (laser beam) radiated from the light-emitting element 220 exhibits divergence and an elliptic far-field pattern (hereinafter referred to as "FFP") in a plane parallel to an emission end surface.
The FFP indicates the shape or light intensity distribution of emitted light at a position away from the emission end surface.

In the elliptic shape of light emitted from the light-emitting element 220, a direction lying along the major axis of the elliptic shape is referred to as the fast axis direction of the FFP, and a direction lying along the minor axis of the elliptic shape is referred to as the slow axis direction of the FFP. The fast axis direction of the FFP of the light-emitting element 220 can correspond to the direction of layering of a plurality of semiconductor layers including an active layer of the light-emitting element 220.

On the basis of the light intensity distribution of the FFP of the light-emitting element 220, light having an intensity of $1/e^2$ or more of the peak intensity is referred to as the main portion of light. The angle corresponding to an intensity of $1/e^2$ in the light intensity distribution is referred to as an angle of divergence. The angle of divergence in the fast axis direction of the FFP is larger than the angle of divergence in the slow axis direction of the FFP.

Light at the center of the elliptic shape of FFP, in other words, light with the peak intensity in the light intensity distribution of the FFP, is referred to as light traveling along an optical axis. An optical path of light traveling along the center of the elliptic FFP is referred to as the optical axis of the light.

A light-emitting element that emits blue light can be used for the light-emitting element 220. The statement "light-emitting element that emits blue light" as used herein indicates that a light-emitting element to be used emits light with a peak emission wavelength within the range of 405 nm to 494 nm. A light-emitting element that emits light with a peak wavelength in a range of 430 nm to 480 nm is preferably used as the light-emitting element 220. Examples of such a light-emitting element 220 include a semiconductor laser element containing a nitride semiconductor. For the nitride semiconductor, for example, GaN, InGaN, or AlGaN can be used.

The emission peak of light emitted from the light-emitting element 220 is not limited to the above. For example, light emitted from the light-emitting element 220 can be visible light including green light and red light, ultraviolet light, or infrared light with wavelengths outside the above wavelength range, other than blue light.

Submount 230

For example, the submount 230 has a rectangular parallelepiped shape and has a lower surface, an upper surface, and one or more lateral surfaces. The width of the submount 230 is the smallest in the upper-lower direction. The shape of the submount 230 is not limited to a rectangular parallelepiped shape. For example, the submount 230 is formed of aluminum nitride or silicon carbide but may be formed of another material.

In the example shown in the drawings, a first metal portion 231a is disposed on the upper surface of the submount 230, and a second metal portion 231b is disposed on the lower surface of the submount 230. Examples of the material constituting the first metal portion 231a and the second metal portion 231b include metals such as copper. The area of the first metal portion 231a is smaller than the area of the second metal portion 231b in a top view. The first metal portion 231a is disposed on a portion of the upper surface of the submount 230. The first metal portion 231a is not disposed on the entire upper surface of the submount 230. In the example shown in the drawings, the first metal portion 231a is rectangular in a top view. In the case in which the upper surface of the submount 230 has an elongated rectangular shape, the first metal portion 231a is disposed along a portion in the long side direction of the elongated rectangular shape. The first metal portion 231a is located closer to one of two opposite short sides of the elongated rectangular shape than the other of the two opposite short sides. The second metal portion 231b is disposed on the lower surface of the submount 230. The second metal portion 231b is located directly below the entire first metal portion 231a with the submount 230 therebetween and located directly below at least a portion of the second metal film 232b described below in a top view.

The first metal film 232a is further disposed on the first metal portion 231a. For example, the first metal film 232a is disposed on a portion of the upper surface of the first metal portion 231a. In the example shown in the drawings, the first metal film 232a is sandwiched between regions of the first metal portion 231a not provided with the first metal film 232a in a top view. The area of the first metal film 232a is smaller than the area of the regions of the first metal portion 231a not provided with the first metal film in a top view. The second metal film 232b is further disposed on a region of the upper surface of the submount 230 not provided with the first metal portion 231a. The area of the second metal film 232b is larger than the area of the first metal film 232a in a top view. For example, the first metal film 232a and the second metal film 232b are formed of a metal such as gold.

The metal portions and the metal films disposed on the submount 230 have been described. However, for example, a configuration may be employed in which the metal portions are not disposed and only the metal films are disposed. Providing the metal portions on the upper surface and the lower surface of the submount allows for improvement of the heat dissipation performance. In particular, heat generated from a member disposed directly above the first metal portion 231a can be efficiently dissipated. Each of the first metal portion 231a and the second metal portion 231b has a greater thickness than the thicknesses of a respective one of the first metal film 232a and the second metal film 232b in the direction perpendicular to the upper surface of the submount.

Wavelength Conversion Member 240

The wavelength conversion member 240 includes the wavelength conversion portion 241 and a surrounding portion 242. The wavelength conversion portion 241 has an upper surface 241a, a lower surface 241b that is a surface opposite to the upper surface 241a, and a plurality of lateral surfaces. FIG. 6 is a schematic perspective view of an example of the wavelength conversion portion. In the example of FIG. 6, the wavelength conversion portion 241 has an incident lateral surface 241i, a first lateral surface 241c, a second lateral surface 241d, a third lateral surface 241e, and a fourth lateral surface 241f as the lateral surfaces.

The first lateral surface 241c, the second lateral surface 241d, the third lateral surface 241e, and the fourth lateral surface 241f are connected to the outer edges of the upper surface 241a and the outer edges of the lower surface 241b. The third lateral surface 241e is connected to each of the first lateral surface 241c and the fourth lateral surface 241f. The fourth lateral surface 241f is connected to the second lateral surface 241d and the third lateral surface 241e. The first lateral surface 241c is not connected to the fourth lateral surface 241f. The second lateral surface 241d is not connected to the third lateral surface 241e.

A lateral side of the first lateral surface 241c and a lateral side of the second lateral surface 241d are connected to each other on upper portions thereof and are connected to the incident lateral surface 241i on lower portions thereof. The first lateral surface 241c and the second lateral surface 241d are connected to each other at a portion above the midpoint between the upper surface 241a and the lower surface 241b in the direction perpendicular to the upper surface 241a. The first lateral surface 241c and the second lateral surface 241d are connected to the incident lateral surface 241i at portions below the midpoint. For example, the midpoint is the highest point of the incident lateral surface 241i. The lower side of the incident lateral surface 241i is connected to the outer edge of the lower surface 241b. The lower side of the incident lateral surface 241i is depressed inward from the portion at which the first lateral surface 241c and the second lateral surface 241d are connected. In other words, a lower side of the incident lateral surface 241i is depressed from the portion at which the first lateral surface 241c and the second lateral surface 241d are connected toward the portion at which the third lateral surface 241e and the fourth lateral surface 241f are connected.

The first lateral surface 241c and the fourth lateral surface 241f may be parallel to each other in a top view. The second lateral surface 241d and the third lateral surface 241e may be parallel to each other in a top view. The first lateral surface 241c and the second lateral surface 241d, the first lateral surface 241c and the third lateral surface 241e, the third lateral surface 241e and the fourth lateral surface 241f, and the fourth lateral surface 241f and the second lateral surface 241d may be perpendicular to each other in a top view.

The wavelength conversion portion 241 is to be irradiated with light.

Accordingly, it is preferable that the base material of the wavelength conversion portion 241 be mainly formed of an inorganic material hardly decomposed by irradiation with light. For example, the main material is a ceramic. In the case in which the main material of the wavelength conversion portion 241 is a ceramic, examples of the ceramic include aluminum oxide, aluminum nitride, silicon oxide, yttrium oxide, zirconium oxide, and magnesium oxide. In order to prevent deterioration such as deformation and discoloration of the wavelength conversion portion 241 due to heat, a material having a melting point of 1,300° C. to 2,500° C. is preferably selected as the main material of the ceramic. The term "main material" of a specific member as used herein refers to a material constituting the largest proportion in the component on the basis of the mass or volume ratio. Also, the term "main material" as used herein may indicate that no other material is contained, that is, the main material alone constitutes the component. The wavelength conversion portion 241 may be formed of a material other than ceramics as the main material.

The wavelength conversion portion 241 contains a phosphor. For example, the wavelength conversion portion 241 can be formed by sintering a phosphor and aluminum oxide or the like. The content of the phosphor can be 0.05 vol % to 50 vol % relative to the total volume of the ceramic. For example, a ceramic that is formed by sintering phosphor powder and consists substantially of the phosphor may be used. The wavelength conversion portion 241 may be formed of a single crystal of a phosphor.

Examples of the phosphor include cerium-activated yttrium-aluminum-garnet (YAG), cerium-activated lutetium-aluminum-garnet (LAG), europium-activated silicate ((Sr,Ba)$_2$SiO$_4$), α-SiAlON phosphors, and β-SiAlON phosphors.

Among these phosphors, YAG phosphors have good heat resistance.

The surrounding portion 242 has an upper surface 242a, a first lower surface 242b and a second lower surface 242c that are surfaces opposite to the upper surface 242a, a plurality of inner lateral surfaces connected to inner edges of the upper surface 242*a* and inner edges of the first lower surface 242*b*, and a plurality of outer lateral surfaces connected to outer edges of the upper surface 242*a* and outer edges of the first lower surface 242*b* and/or the outer edges of the second lower surface 242*c*. The surrounding portion 242 further has a connecting lateral surface 242*d* that meets the first lower surface 242*b* and is connected to the second lower surface 242*c*. The second lower surface 242*c* and the connecting lateral surface 242*d* are connected via a rounded edge portion in a lateral view. A plurality of inner lateral surfaces of the surrounding portion 242 preferably have a reflectance of light of 80% or more and 100% or less.

The surrounding portion 242 is disposed around the wavelength conversion portion 241. The surrounding portion 242 covers the lateral surfaces of the wavelength conversion portion 241 except for the incident lateral surface 241*i*. The incident lateral surface 241*i* is not covered with the surrounding portion 242 but is exposed from the surrounding portion 242. In the example shown in the drawings, the incident lateral surface 241*i* is connected to the connecting lateral surface 242*d* of the surrounding portion 242, and the incident lateral surface 241*i* and the connecting lateral surface 242*d* are in the same plane. A plurality of inner lateral surfaces of the surrounding portion 242 cover the first lateral surface 241*c*, the second lateral surface 241*d*, the third lateral surface 241*e*, and the fourth lateral surface 241*f* of the wavelength conversion portion 241.

The upper surface 242*a* of the surrounding portion 242 and the upper surface 241*a* of the wavelength conversion portion 241 are in the same plane. Likewise, the first lower surface 242*b* of the surrounding portion 242 and the lower surface 241*b* of the wavelength conversion portion 241 are in the same plane. The upper surface 242*a* and the upper surface 241*a* of the wavelength conversion portion 241 are not necessarily in the same plane. Likewise, the first lower surface 242*b* of the surrounding portion 242 and the lower surface 241*b* of the wavelength conversion portion 241 is not necessarily in the same plane. In the example shown in the drawings, all the four sides at which the four outer lateral surfaces meet the upper surface 242*a* of the surrounding portion 242 are nonparallel to the four sides at which the upper surface 241*a* meets the four lateral surfaces of the wavelength conversion portion 241 in a top view. The term "nonparallel" as used herein indicates that two sides of interest form an angle of 5° or more.

The surrounding portion 242 further has a protrusion 242*t*. In the present specification, a portion of the surrounding portion 242 located above the incident lateral surface 241*i* and protruding outward relative to the incident lateral surface 241*i* in the direction perpendicular to the incident lateral surface 241*i* is referred to as the "protrusion 242*t*."

The protrusion 242*t* has at least a portion of the upper surface 242*a* of the surrounding portion 242, the second lower surface 242*c*, and a plurality of outer lateral surfaces connected to the upper surface 242*a* and the second lower surface 242*c*. The protrusion 242*t* does not have the first lower surface 242*b*. When the surrounding portion 242 is divided into two portions by a plane that is parallel to the flat portion of the incident lateral surface 241*i* and passes through the portion at which the first lateral surface 241*c* and the second lateral surface 241*d* are connected, the protrusion 242*t* is a portion located on a side not in contact with the first lateral surface 241*c* or the second lateral surface 241*d* except for the connecting portion.

In a top view, the protrusion protrudes outward of the incident lateral surface 241*i* from one end to the other end of the wavelength conversion member 240 in a direction of a plane in which the incident lateral surface 241*i* and the connecting lateral surface 242*d* extend. Among the outer lateral surfaces of the protrusion 242*t*, an outer lateral surface oriented to the same direction as the incident lateral surface 241*i* and/or the connecting lateral surface 242*d* is referred to as a protruding surface 242*e*. In the example shown in the drawings, the protruding surface 242*e* is parallel to the incident lateral surface 241*i* and the connecting lateral surface 242*d*. For example, the protruding surface 242*e* is perpendicular to the first lower surface 242*b* and the upper surface 242*a*. The term "parallel" as used herein indicates that two surfaces of interest meet at an angle within ±5°. The term "perpendicular" as used herein indicates that two surfaces of interest meet at an angle of 85° or more and 95° or less.

In any case, even in the case in which surfaces of interest do not meet each other but planes in which the respective surfaces extend intersect with each other, the intersection angle between the two planes can be regarded as the angle at which the two surfaces of interest meet.

For example, the surrounding portion 242 is a sintered body formed using a ceramic as a main material. Examples of the ceramic used as the main material include aluminum oxide, aluminum nitride, silicon oxide, yttrium oxide, zirconium oxide, and magnesium oxide. The surrounding portion 242 does not necessarily contain a ceramic as a main material. For example, the surrounding portion 242 may be formed of a metal, a complex of a ceramic and a metal, or a resin.

In the wavelength conversion member 240, the wavelength conversion portion 241 and the surrounding portion 242 can be integrally formed. The wavelength conversion portion 241 and the surrounding portion 242 may be separately formed and bonded together to form the wavelength conversion member 240. For example, the wavelength conversion portion 241 and the surrounding portion 242 constitute an integrated sintered body.

The wavelength conversion member 240 may be provided with an anti-reflection film on the upper surface. The upper surface of the wavelength conversion member 240 herein refers to the upper surface 241*a* of the wavelength conversion portion 241 and/or the upper surface 242*a* of the surrounding portion 242. In the example shown in the drawings, the upper surface of the wavelength conversion member 240 includes the upper surfaces 241*a* and 242*a*. In other words, the anti-reflection film can be disposed on the upper surface 241*a* of the wavelength conversion portion 241 and/or the upper surface 242*a* of the surrounding portion 242. The lower surface of the wavelength conversion portion 240 is provided with a metal film. The lower surface of the wavelength conversion member 240 herein refers to the lower surface 241*b* of the wavelength conversion portion 241 and/or the first lower surface 242*b* of the surrounding portion 242. In the example shown in the drawings, the lower surface of the wavelength conversion member 240 includes the lower surface 241*b* and the first lower surface 242*b*. The lower surface of the wavelength conversion member 240 does not include the second lower surface 242*c* of the surrounding portion 242. In other words, a metal film may be disposed on the lower surface 241*b* of the wavelength conversion portion 241 and/or the first lower surface 242*b* of the surrounding portion 242. The incident lateral surface 241*i* of the wavelength conversion member 240 may be provided with a reflective film.

Protective Element 250

The protective element 250 is a component for protecting a specific element such as a semiconductor laser element.

For example, the protective element 250 is a component for preventing an excessive current from flowing through and breaking a specific element such as a semiconductor laser element. For example, a Zener diode formed of Si can be used as the protective element 250. For example, the protective element 250 may be a component for measuring the temperature to prevent a specific element from breaking due to the temperature environment. A thermistor can be used as such a temperature measuring element. The temperature measuring element is preferably disposed near the emission end surface of the light-emitting element 220.

Wiring 270

The wirings 270 are each constituted of a linear electric conductor with both ends serving as bonding portions. In other words, the wiring 270 includes bonding portions bonded to other components at both ends of the linear portion. The wiring 270 is used to electrically connect two components. For example, a metal wire can be used for the wiring 270. Examples of the metal include gold, aluminum, silver, copper, and tungsten.

Light-Emitting Device 200

Subsequently, the light-emitting device 200 is described.

The one or more light-emitting elements 220 are disposed on the upper surface 211a of the base member 211. In the example shown in the drawings, a single light-emitting element 220 is disposed on the upper surface 211a. The lateral sides of the light-emitting element 220 are further surrounded by the frame member 212 in a top view viewed in a direction perpendicular to the upper surface 211a of the base member 211. Hereinafter the "top view" refers to a "top view" viewed in the direction perpendicular to the upper surface 211a of the base member 211 unless otherwise noted. The light-emitting element 220 emits light traveling in a lateral direction. For example, the light emitted from the light-emitting element 220 is blue light. The light emitted from the light-emitting element 220 is not limited to blue light. In the example shown in the drawings, the light-emitting element 220 is a semiconductor laser element.

The light-emitting element 220 is mounted on the submount 230 disposed on the upper surface 211a of the base member 211. More specifically, the light-emitting element 220 is disposed in a region in which the first metal portion 231a disposed on the upper surface of the submount 230 is disposed. Still more specifically, the light-emitting element 220 is bonded to the first metal film 232a disposed on the first metal portion 231a with, for example, a metal adhesive therebetween. The lower surface of the submount 230 provided with the second metal portion 231b is bonded to the upper surface 211a of the base member 211 with, for example, a metal adhesive therebetween. Examples of the metal adhesive used for the bonding include AuSn.

The light-emitting element 220 is disposed such that the emission end surface is oriented to the same direction as one of the lateral surfaces of the submount 230. For example, the emission end surface of the light-emitting element 220 can be parallel/perpendicular to one of the inner lateral surfaces 212c or one of the outer lateral surfaces 212d of the frame member 212.

The wavelength conversion member 240 is disposed on the upper surface 211a of the base member 211. The wavelength conversion member 240 is disposed in the lateral direction of the light-emitting element 220. More specifically, the wavelength conversion member 240 is located at a position on which light that is emitted from the light-emitting element 220 and travels in the lateral direction is incident. Furthermore, the wavelength conversion member 240 is located on the optical axis of the light emitted in the lateral direction from the light-emitting element 220. In the example shown in the drawings, the direction of the optical axis of the emitted light is not converted from the emission of the light from the light-emitting element 220 until the incidence on the wavelength conversion portion 241 of the wavelength conversion member 240. In the example shown in the drawings, there is no other member between the light-emitting element 220 and the wavelength conversion portion 241. This structure allows for reduction in the size of the light-emitting device 200. Note that another member such as a collimating lens may be disposed between the light-emitting element 220 and the wavelength conversion portion 241.

For example, the wavelength conversion member 240 is disposed on the upper surface 211a of the base member with the submount 230 therebetween. In the example shown in the drawings, the wavelength conversion member 240 is disposed on the submount on which the light-emitting element 220 is disposed. Disposing the light-emitting element 220 and the wavelength conversion member 240 on the same submount 230 allows the light-emitting element 220 and the wavelength conversion member 240 to be disposed closely to each other. This allows the emitting light that is emitted from the light-emitting element 220 and has divergence to efficiently enter the wavelength conversion member 240, leading to reduction in the size of the light-emitting device 200. The wavelength conversion member 240 may be disposed on a submount different from the submount on which the light-emitting element 220 is disposed. In this case, the upper surface of the submount, on which the wavelength conversion member 240 is disposed, is not positioned higher than the lower surface of the light-emitting element 220.

In the example shown in the drawings, the wavelength conversion member 240 is disposed in a region of the upper surface of the submount 230 not provided with the first metal portion 231a. More specifically, the metal film disposed on the lower surface of the wavelength conversion member 240 and the second metal film 232b disposed on the upper surface of the submount 230 are bonded together with, for example, a metal adhesive therebetween. Examples of the metal adhesive include AuSn. A portion of the second metal portion 231b is disposed in at least a portion of a region of the lower surface of the submount 230 located directly below the wavelength conversion member 240. In other words, the lower surface of the wavelength conversion member 240 and the second metal film 232b overlap with the second metal portion 231b in a top view.

The wavelength conversion member 240 has an incident lateral surface on which light that is emitted from the emission end surface of the light-emitting element 220 and travels in the lateral direction is incident, and an exit surface that emits light obtained by wavelength conversion of the incident light. In the example shown in the drawings, the incident lateral surface 241i and the upper surface 241a of the wavelength conversion portion 241 respectively serve as the incident lateral surface and the exit surface. Light emitted from the light-emitting element is wavelength-converted by the wavelength conversion portion 241 and is emitted upward from the upper surface 241a of the wavelength conversion portion 241. The surrounding portion 242 of the wavelength conversion member 240 is disposed around the wavelength conversion portion 241. The surrounding portion 242 reflects light that has entered the wavelength conversion portion 241 and has been incident on the inner lateral surfaces of the surrounding portion 242. The light reflected by the surrounding portion 242 travels inside the wavelength conversion portion 241. This structure allows light incident on the incident lateral surface 241*i* to be efficiently emitted from the upper surface 241*a*, which is the exit surface.

In a bottom view, an intersection between an extension of the side at which the first lateral surface 241*c* meets the lower surface 241*b* of the wavelength conversion portion 241 and an extension of the side at which the second lateral surface 241*d* meets the lower surface 241*b* is located on a second direction side (as defined below), which is the side opposite to the direction of travel of light, with respect to the incident lateral surface 241*i*. In other words, the two extensions intersect with each other on the second direction side, that is, the light-emitting element 220 side, with respect to the incident lateral surface 241*i*. In a bottom view, the third lateral surface 241*e* and the fourth lateral surface 241*f* of the wavelength conversion portion 241 meet each other in a first direction, which is the side of the direction of travel of light, that is, on the side opposite to the light-emitting element 220, with respect to the incident lateral surface 241*i*.

The term "first direction side" and the term "second direction side" are described. In the present specification, the direction in which light traveling along the optical axis of the light emitted from the light-emitting element 220 is referred to as the first direction. In the example shown in the drawings, the direction in which light traveling along the optical axis of the light emitted from the light-emitting element 220 and a virtual line OA, which is a virtual extension of the optical axis, travels is regarded as the "first direction". In the present specification, when the positions of two or more members are compared with one another, one of the members is regarded as being located on the "first direction side" with respect to the other members when the one member is located on the positive direction side in the first direction compared with the other members. Conversely, the direction opposite to the first direction is referred to as the "second direction," and one of the members is regarded as being located on the "second direction side" with respect to the other members when the one member is located on the positive direction side in the second direction compared with the other members. In the example shown in the drawings, the wavelength conversion member 240 is located on the first direction side with respect to the light-emitting element 220, and the light-emitting element 220 is located on the second direction side with respect to the wavelength conversion member 240.

Above the light-emitting element 220, the protrusion 242*t* of the surrounding portion 242 included in the wavelength conversion member 240 protrudes on the second direction side (light-emitting element 220 side) with respect to the incident lateral surface 241*i*. The protrusion 242*t* protrudes on the second direction side (light-emitting element 220 side) with respect to the end of the lower surface of the wavelength conversion member 240 on the second direction side (light-emitting element 220 side). More specifically, the protrusion 242*t* protrudes on the second direction side (light-emitting element 220 side) with respect to the end(s) of the lower surface 241*b* of the wavelength conversion portion 241 and/or the first lower surface 242*b* of the surrounding portion 242 on the light-emitting element side. The protrusion 242*t* overlaps with an emission end surface 220*a* of the light-emitting element 220 in a top view. More specifically, the emission end surface 220*a* overlaps with the second lower surface 242*c* of the protrusion 242*t* in a top view. The protruding surface 242*e* of the protrusion 242*t* is located on the second direction side with respect to the emission end surface 220*a*. The emission end surface 220*a* of the light-emitting element 220 is hidden by the protrusion 242*t* in a top view.

The main portion of light emitted from the light-emitting element 220 travels in the lateral direction and enters the wavelength conversion portion 241. More specifically, the incident lateral surface 241*i* includes the region in which the wavelength conversion portion 241 is irradiated with the main portion of light emitted from the light-emitting element 220. The wavelength conversion portion 241 performs wavelength conversion of incident light and emits wavelength-converted light upward from the upper surface 241*a*. On the other hand, a portion of light that has leaked out of the active layer of the light-emitting element 220 and/or a portion of light other than the main portion of light emitted from the light-emitting element 220 can be leaking light traveling upward from the emission end surface 220*a* and the vicinity. The leaking light does not enter the wavelength conversion portion 241 but travels upward without being subjected to wavelength conversion. As described above, by disposing the protrusion 242*t* of the surrounding portion 242 to overlap with the emission end surface 220*a* of the light-emitting element 220 in a top view, the protrusion 242*t* reflects the leaking light traveling upward, thereby suppressing emission of the leaking light out of the light-emitting device 200. It is possible to inhibit the leaking light that does not enter the wavelength conversion portion 241 from being mixed into light that enters the wavelength conversion portion 241 and is emitted from the light-emitting device 200. It is thus possible to provide the light-emitting device 200 in which the effect of light not used as the emitting light of the light-emitting element 220 on light that enters the wavelength conversion member 240 and is extracted is suppressed.

The protrusion 242*t* preferably overlaps with the entire emission end surface 220*a* of the light-emitting element 220 in a top view. Specifically, the protruding surface 242*e* is located at a side toward the second direction with respect to the emission end surface 220*a* in a top view. The protruding surface 242*e* is longer than the entirety of the emission end surface 220*a* in a direction parallel to the emission end surface 220*a* in a top view. Such an arrangement allows for enhancement of the effect of reducing leaking light described above. In the case in which the light-emitting device 200 includes a plurality of light-emitting elements 220, the protrusion 242*t* preferably overlaps with the emission end surfaces 220*a* of all the light-emitting elements 220 in a top view. It is thus possible to reduce leaking light traveling upward from the emission end surfaces 220*a* of all the light-emitting elements 220. In the case in which the light-emitting device 200 includes a plurality of light-emitting elements 220, the protrusion 242*t* overlaps with the entire emission end surface 220*a* of each light-emitting element 220 in a top view. Specifically, the protruding surface 242*e* is located on the second direction side with respect to the whole of each emission end surface 220*a*. The protruding surface 242*e* is longer in the direction parallel to the emission end surface 220*a* in a top view than a straight line connecting the endpoints of each of the emission end surfaces 220*a* of the light-emitting elements at both ends among a plurality of light-emitting elements 220. Although not shown in the drawings, the protruding surface 242*e* is longer than the longest one of the "straight lines connecting the endpoints" described above.

The case in which the light emitted from the light-emitting element 220 is blue light is described as a specific example. The main portion of light emitted from the light-emitting element 220 is emitted in the lateral direction and enters the wavelength conversion portion 241. A portion of the light that has entered the wavelength conversion portion 241 is subjected to wavelength conversion into, for example, yellow light and is emitted from the upper surface 241a of the wavelength conversion portion 241. The yellow light is mixed with blue light that has entered the wavelength conversion portion 241, has not been wavelength-converted, and has been emitted from the upper surface 241a to constitute, for example, white light that is emitted from the light-emitting device 200. On the other hand, leaking light incident upward from the emission end surface 220a of the light-emitting element 220 is blue light and can be emitted from the light-emitting device 200 and mixed with the white light. The white light mixed with the leaking light may show unevenness in color. By disposing the protrusion 242t of the surrounding portion 242 so as to overlap with the emission end surface 220a in a top view, it becomes possible to inhibit the leaking light from interfering and being mixed in terms of colors with the emitting light from the upper surface 241a of the wavelength conversion portion 241, so that unevenness in color can be reduced.

For example, the wavelength conversion portion 241 is disposed such that the optical axis of the light emitted from the light-emitting element 220 passes through the incident lateral surface 241i in a top view as shown in FIG. 7 and FIG. 8. The upper surface 241a of the wavelength conversion portion 241 may be symmetric about the virtual line OA lying along the optical axis up to the incidence on the incident lateral surface 241i in a top view. Likewise, the upper surface of the surrounding portion 242 may be symmetric about the virtual line OA in a top view.

In the example shown in the drawings, the virtual line OA passes through the midpoint of the incident lateral surface 241i in the direction perpendicular to the upper surface 211a and meets one of the inner lateral surfaces 212c of the frame member 212. With such a structure, even when the wavelength conversion portion 241 is damaged and fails to receive the light emitted from the light-emitting element 220 in the lateral direction, the light emitted from the light-emitting element 220 in the lateral direction is applied to the frame member 212 located on the optical path. For example, if the portion of the frame member 212 meeting the virtual line OA and the vicinity constitutes a light-shielding portion formed of a material that absorbs light, light is absorbed by the light-shielding portion, which allows for reduction of the possibility of emission of the light out of the light-emitting device 200.

In the direction parallel to the virtual line OA, a length L1 from the center of the wavelength conversion portion 241 to the tip of the protrusion 242t is greater than a length L2 from the center of the wavelength conversion portion 241 to an end of the surrounding portion 242 opposite to the protrusion 242t in a top view. The term "center of the wavelength conversion portion 241" as used herein refers to the midpoint of a line segment connecting the intersection point of the first lateral surface 241c and the second lateral surface 241d and the intersection point of the third lateral surface 241e and the fourth lateral surface 241f in a top view. The tip of the protrusion 242t refers to any point selected from the side at which the protruding surface 242e and the upper surface 242a meet each other. Making the length L1 longer than the length L2 allows for increase in the length of the protrusion 242t from the emission end surface 220a on the second direction side while maintaining the length of the wavelength conversion portion 241 in the virtual line OA direction, so that it is possible to further reduce leaking light emitted out of the light-emitting device 200. The length L1 may be equal to the length L2.

A length L3 from the emission end surface 220a of the light-emitting element 220 to the tip of the protrusion 242t is preferably 0 μm or more and 400 μm or less in the direction parallel to the virtual line OA in a top view. Setting the length L3 to 0 μm or more allows the protrusion 242t to overlap with the emission end surface 220a and allows for reduction of leaking light. Setting the length L3 to 400 μm or less allows a region in which the wiring 270 for connection to the light-emitting element 220 is disposed to be secured.

The light emitted from the light-emitting element 220 travels toward the wavelength conversion member 240 and is incident on the incident lateral surface 241i of the wavelength conversion portion 241 exposed from the surrounding portion 242. At least a portion of the incident lateral surface 241i of the wavelength conversion portion 241 is located below the virtual line OA. This structure allows for light traveling below the virtual line OA out of the light emitted from the light-emitting element 220 to be efficiently introduced from the incident lateral surface 241i into the wavelength conversion portion 241. Light is emitted from the upper surface 241a of the wavelength conversion portion 241 on the basis of the light incident on the incident lateral surface 241i. The term "light emitted on the basis of the incident light" as used herein refers to, for example, incident light or for example, light obtained by wavelength conversion of the incident light.

The emission end surface 220a of the light-emitting element 220 faces the incident lateral surface 241i of the wavelength conversion portion 241. For example, the emission end surface 220a of the light-emitting element 220 is parallel to the incident lateral surface 241i of the wavelength conversion portion 241. For example, length between the incident lateral surface 241i of the wavelength conversion portion 241 and the emission end surface 220a is 20 μm or more and 1,000 μm or less. For example, the length between the incident lateral surface 241i and the end of the protrusion 242t on the second direction side (light-emitting element 220 side) is 50 μm or more and 800 μm or less and is more preferably 100 μm or more and 500 μm or less. Setting the length to 100 μm or more allows for enhancement of the effect of shielding leaking light traveling upward from the emission end surface 220a by the protrusion 242t. By setting the length to 500 μm or less, it becomes possible to secure the region of the upper surface of the light-emitting element 220 to which the wiring 270 is bonded.

Light that has been emitted from the light-emitting element and entered the wavelength conversion portion 241 through the incident lateral surface 241i is reflected by the inner lateral surfaces of the surrounding portion 242, travels toward the upper surface 241a of the wavelength conversion portion 241, and is emitted from the upper surface 241a of the wavelength conversion portion 241. It is thus possible to efficiently emit light from the upper surface 241a.

One of the two lateral surfaces of the light-emitting element 220 meeting the emission end surface 220a faces one of the two opposite inner lateral surfaces 212c or the lateral surface of the stepped portion 214 provided along the one inner lateral surface 212c. For example, one of the two lateral surfaces of the light-emitting element 220 meeting the emission end surface 220a is parallel to one of the inner lateral surfaces 212c or the lateral surface of the stepped portion 214 provided along the one inner lateral surface 212c. The other one of the two lateral surfaces of the light-emitting element 220 meeting the emission end surface faces the other inner lateral surface 212c or the lateral surface of the stepped portion 214 provided along the other inner lateral surface 212c. For example, the other one of the two lateral surfaces of the light-emitting element 220 meeting the emission end surface is parallel to the other inner lateral surface 212c or the lateral surface of the stepped portion 214 provided on the other inner lateral surface 212c. For example, the upper surface 214a of the stepped portion 214 is located below the height of the upper surface 241a of the wavelength conversion portion 241 on the basis of the upper surface 211a of the base member 211. With such heights, light emitted upward from the upper surface 241a is prevented from being directly applied to the stepped portion 214.

For example, the upper surface 214a of the stepped portion 214 is located above the height of the upper surface of the light-emitting element 220 on the basis of the upper surface 211a of the base member 211.

In the light-emitting device 200, the wirings 270 electrically connect the light-emitting element 220 and the protective element 250 to the base member 211 and/or the frame member 212. The wirings 270 in the light-emitting device 200 are shown in the drawings as an example in which the protective element 250 is a Zener diode, but wiring connections different from the connections shown in the drawings may be employed in the case in which the protective element 250 is a temperature measuring element.

The light-emitting element 220 is electrically connected to the metal film disposed on the upper surface 214a of the stepped portion 214 via the wiring 270. In the example shown in the drawings, one end of the wiring 270 is bonded to the metal film 221 disposed on the upper surface of the light-emitting element 220. For example, the light-emitting device 200 includes a plurality of wirings 270. The wirings 270 include a wiring 270 having one of both ends bonded to the upper surface 214a of the stepped portion 214 and the other end bonded to the submount 230. In the example shown in the drawings, the other end is bonded to the upper surface of the first metal portion 231a disposed on the submount.

The wiring 270 for connection to the light-emitting element 220 is bonded to the upper surface of the light-emitting element 220 and the metal film disposed on the upper surface 214a of the stepped portion 214 on the second direction side (side opposite to the wavelength conversion member 240) with respect to the center of the light-emitting element 220. Disposing the wiring 270 for connection to the light-emitting element 220 in this manner allows for increase of the region in which the wiring 270 does not overlap with the protrusion 242t in a top view and therefore allows for increase of the protrusion amount of the protrusion 242t on the second direction side (light-emitting element 220 side).

For example, the metal film disposed on the lower surface 211b of the base member 211 can be used for the electrical connection between the light-emitting element 220 and an external power source. This structure allows the light-emitting element 220 to be electrically connected to the external power source via the metal film on the upper surface 212a of the frame member 212 electrically connected via a metal material disposed in a via hole to the metal film disposed on the upper surface 214a of the stepped portion 214.

The cover 213 is disposed on the upper surface 212a of the frame member 212. Specifically, the cover 213 is supported by the upper surface 212a of the frame member 212 and is disposed above the light-emitting element 220 surrounded by the frame member 212. For example, the outer peripheral portion of the lower surface of the cover 213 is bonded to the upper surface 212a of the frame member 212. For example, the metal film disposed on the outer peripheral portion of the lower surface of the cover 213 is bonded and fixed via Au—Sn or the like to the metal film disposed on the upper surface 212a of the frame member 212.

The cover 213 is bonded to the upper surface 212a of the frame member 212 to define a sealed space in which the light-emitting element 220 and the wavelength conversion member 240 are disposed. The sealed space may be defined in a hermetically sealed state. Hermetically sealing the sealed space allows for suppression of dust collection of organic matter and the like on the emission end surface 220a of the light-emitting element 220.

The cover 213 has the light-transmissive region that transmits light emitted from the upper surface 241a of the wavelength conversion portion 241 to emit the light to the outside. That is, light emitted from the upper surface 241a of the wavelength conversion portion 241 on the cover 213 side may be transmitted through the light-transmissive region of the cover 213 and emitted out of the light-emitting device 200. The entirety of the cover 213 may be the light-transmissive region. The light-transmissive region of the cover 213 transmits 70% or more of light emitted from the light-emitting element 220 and light emitted from the wavelength conversion member 240.

Modified Examples

Subsequently, a light-emitting device 201 according to a modified example is described with reference to FIG. 1 to FIG. 3 and FIG. 11.

Figure 11:
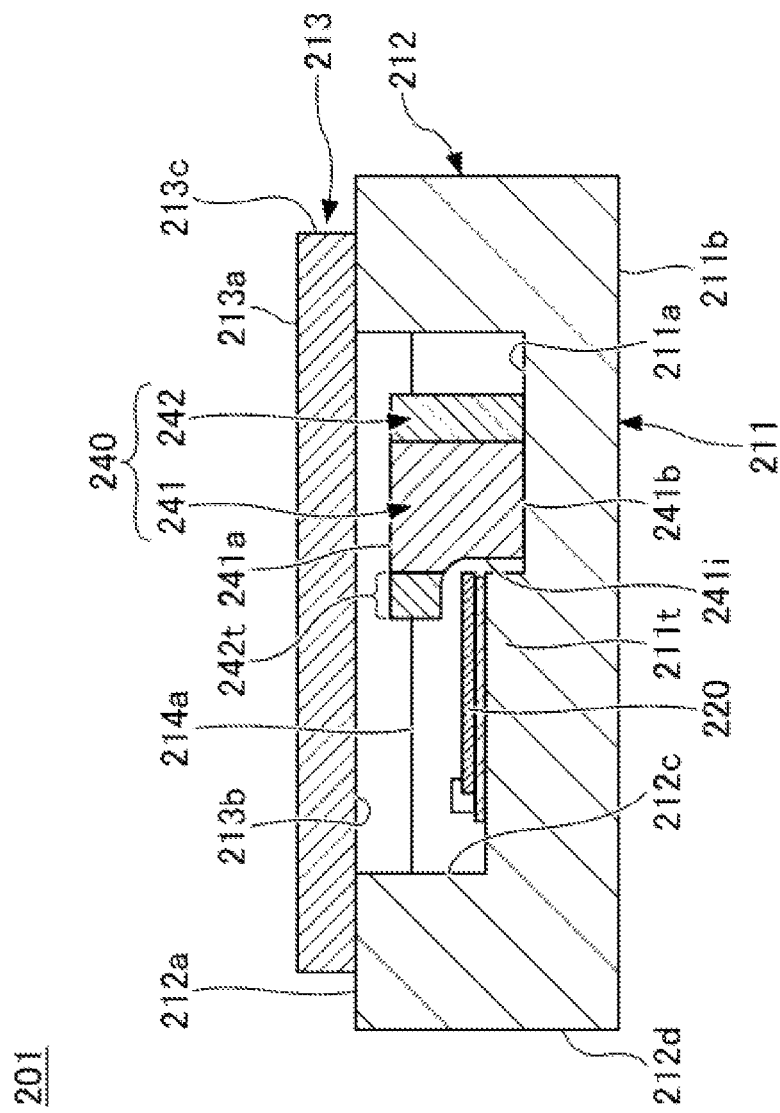
FIG. 11 is a schematic cross-sectional view of a modified example of the light-emitting device according to the first embodiment taken along the cutting-plane line XI-XI of FIG. 1.

FIG. 1 is a schematic perspective view of the light-emitting device 201 according to a modified example of the first embodiment. FIG. 2 is a schematic perspective view of the light-emitting device 201 shown in FIG. 1 without the cover 213. FIG. 3 is a schematic top view of the light-emitting device 201 shown in FIG. 2. FIG. 11 is a schematic cross-sectional view of the light-emitting device 201 taken along the cutting-plane line XI-XI of FIG. 1.

In the light-emitting device 201 according to the modified example, the base member 211 and the frame member 212 are integrally formed. The base member 211 has a projection 211t on the upper surface 211a side. In the example shown in the drawings, the upper surface 211a of the base member 211 includes the upper surface of the projection 211t and an upper surface located below the upper surface of the projection 211t. The light-emitting element 220 is directly disposed on the upper surface of the projection 211t. The wavelength conversion member 240 is directly disposed on the upper surface located below the upper surface of the projection 211t. The light-emitting element 220 and the wavelength conversion member 240 are not disposed on the submount. The base member 211 does not necessarily have the projection 211t.

Examples of the main material used for the base member 211 and the frame member 212 integrally formed include ceramics. Examples of the ceramics include aluminum nitride, silicon nitride, aluminum oxide, and silicon carbide. The main material constituting the base member 211 and the frame member 212 is not limited to a ceramic but may be, for example, a metal such as copper.

Second Embodiment

Subsequently, a light-emitting device 300 according to a second embodiment is described with reference to FIG. 1, FIG. 12, and FIG. 13. The light-emitting device 300 according to the second embodiment differs from the light-emitting device 200 according to the first embodiment in that the light-emitting device 300 includes a light-transmissive member 313 provided with a light-shielding film 380 on a lower surface 313b of the light-transmissive member 313.

FIG. 1 is a schematic perspective view of the light-emitting device 300 according to the second embodiment and a light-emitting device 301 according to a modified example of the second embodiment. FIG. 12 is a schematic enlarged cross-sectional view of the light-emitting element 220, the wavelength conversion member 240, the light-transmissive member 313, and the vicinity in the light-emitting device 300 according to the second embodiment taken along the cutting-plane line XII-XII of FIG. 1. FIG. 13 is a schematic enlarged cross-sectional view of the light-emitting element 220, the wavelength conversion member 240, the light-transmissive member 313, and the vicinity in the light-emitting device 301 according to the modified example of the second embodiment taken along the cutting-plane line XIII-XIII of FIG. 1.

Each member will be first described below. Descriptions overlapping with the descriptions of the first embodiment are omitted as appropriate.

Light-Transmissive Member 313

The light-transmissive member 313 is formed of a light-transmissive main material. The term "light-transmissive" as used herein indicates that the transmittance of light having a specific wavelength is 80% or more. Examples of the main material constituting the light-transmissive member 313 include sapphire and glass made of silicon oxide or silicon nitride.

The light-transmissive member 313 has an upper surface, the lower surface 313b, and one or more lateral surfaces meeting the upper surface and the lower surface 313b. The one or more lateral surfaces connect the outer edges of the upper surface and the outer edges of the lower surface 313b. For example, the light-transmissive member 313 has a rectangular parallelepiped shape. The shape of the light-transmissive member 313 is not limited to a rectangular parallelepiped but can be, for example, a prism.

The light-transmissive member 313 is disposed above the wavelength conversion member 240 and the light-emitting element. In the example shown in the drawings, the light-transmissive member 313 is supported by the frame member 212. More specifically, the lower surface 313b of the light-transmissive member 313 is bonded to the upper surface 212a of the frame member 212. In the case in which the light-transmissive member 313 is supported by the frame member 212, the light-transmissive member 313 may be referred to as a "cover." The "cover" in this case is identical to the "cover 213" in the first embodiment. The light-transmissive member 313, the frame member 212, and the base member 211 define a sealed space in which the light-emitting element 220 and the wavelength conversion member 240 are sealed.

Light-Shielding Film 380

The light-shielding film 380 can be disposed on the upper surface and/or the lower surface 313b of the light-transmissive member 313. In the example shown in FIG. 12 and FIG. 13, the light-shielding film 380 is disposed on the lower surface 313b of the light-transmissive member 313.

The light-shielding film 380 is formed of a member that reflects or absorbs incident light. The light-shielding film 380 can be a metal film formed of a metal. Examples of the metal used for the metal film include titanium, aluminum, gold, silver, copper, platinum, chromium, nickel, iron, zinc, cobalt, palladium, tantalum, tungsten, and an alloy containing one or more selected from these metals. The member used as the light-shielding film 380 is not limited to a metal film but can be a member that reflects or absorbs light, such as a dielectric film and a dielectric multilayer film made of a resin or an oxide such as $SiO_2$, $Ta_2O_5$, and $TiO_2$.

Light-Emitting Device 300

Subsequently, the light-emitting device 300 according to the second embodiment is described. Descriptions overlapping with the descriptions of the first embodiment are omitted as appropriate, and the light-shielding film 380 and the wavelength conversion member 240 are mainly described.

Figure 12:
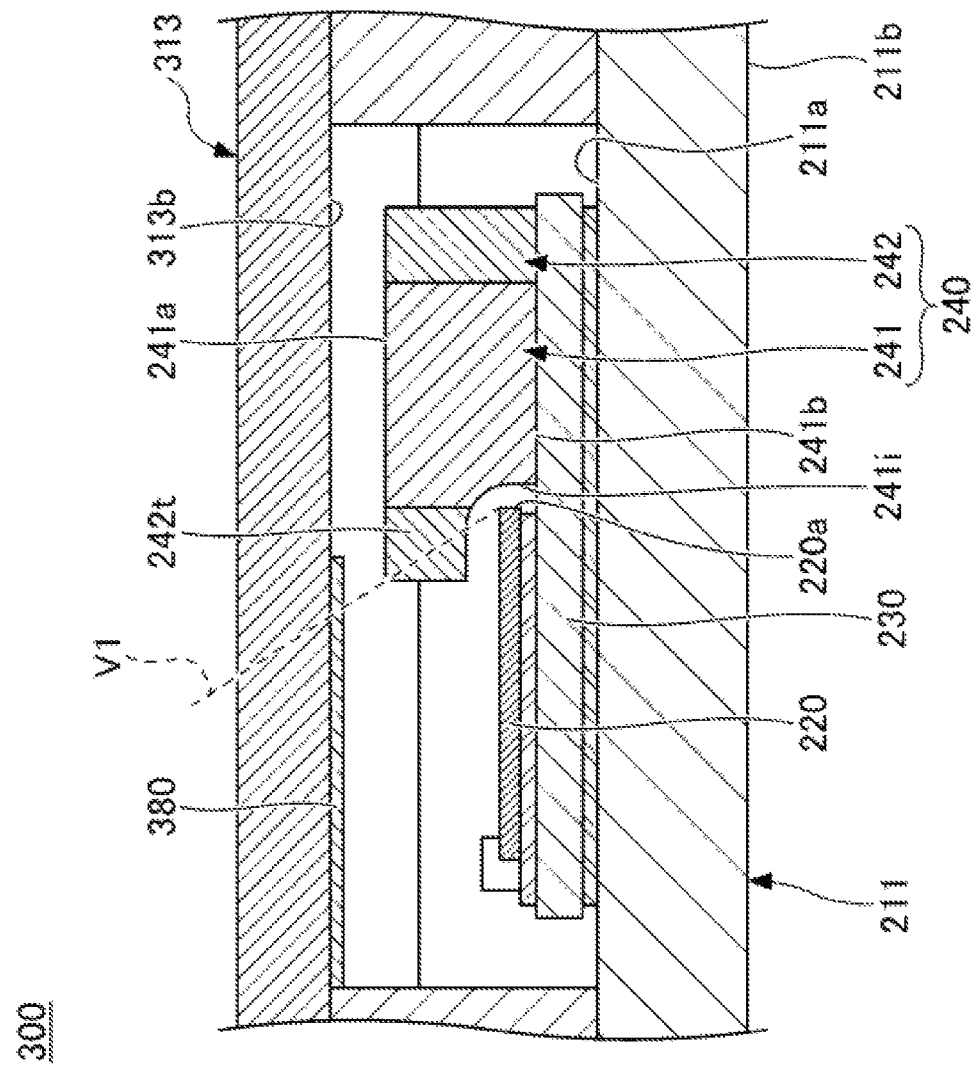
FIG. 12 is a schematic enlarged cross-sectional view of the light-emitting element, the wavelength conversion member, a light-transmissive member, and the vicinity thereof in the light-emitting device according to the second embodiment taken along the cutting-plane line XII-XII of FIG. 1.

As with the first embodiment, in the light-emitting device 300 shown in FIG. 12, the protrusion 242t of the wavelength conversion member 240 overlaps with the emission end surface 220a of the light-emitting element 220 in a top view. In the example shown in the drawings, at least a portion of the light-shielding film 380 disposed on the lower surface 313b of the light-transmissive member 313 overlaps with the protrusion 242t. With at least a portion of the light-shielding film 380 overlapping with the protrusion 242t, even if a portion of light leaking out of the vicinity of the emission end surface 220a of the light-emitting element 220 reaches a region above the wavelength conversion member 240, the portion of light is reflected/absorbed by the light-shielding film 380 and is inhibited from being emitted out of the light-emitting device 300. Unevenness in color is therefore reduced, and it is possible to provide the light-emitting device 300 that emits highly uniform light. In the example shown in the drawings, the emission end surface 220a of the light-emitting element 220 does not overlap with the light-shielding film 380 in a top view.

In the present embodiment, the lower surface 313b of the light-transmissive member 313 has a light-shielding region provided with the light-shielding film 380 and a light-transmissive region not provided with the light-shielding film 380. The light-transmissive region transmits light emitted from the upper surface 241a of the wavelength conversion portion 241. The light-shielding region is located on a virtual straight line V1 (hereinafter referred to as a virtual line V1) connecting any point on the side at which the emission end surface 220a and the upper surface of the light-emitting element 220 meet each other and the end of the protrusion 242t in a lateral view as shown in FIG. 12. The light-transmissive region is not located on the virtual line V1. Disposing the light-shielding film 380 at such a position allows for suppression of emission of light from an unintended region of the light-emitting device 300. At least the majority of the light-shielding region of the lower surface 313b of the light-transmissive member 313 is located on the second direction side (light-emitting element 220 side) with respect to the virtual line V1. The light-shielding region and the light-transmissive region are located in this order on the first direction side (wavelength conversion member 240 side) with respect to the virtual line V1. The light-shielding region is not necessarily provided on the first direction side (wavelength conversion member 240 side) with respect to the virtual line V1. The light-shielding region may be located on a straight line connecting any point that is on the upper surface of the light-emitting element 220 and is 30 μm or more away from the emission end surface 220a in the virtual line OA direction and the end of the protrusion 242t. Disposing the light-shielding region at such a position allows for further improvement of the shielding of leaking light from the vicinity of the emission end surface 220a.

Subsequently, the light-emitting device 301 according to the modified example is described with reference to FIG. 13. The light-emitting device 301 shown in FIG. 13 differs from the light-emitting device 300 according to the second embodiment in that the protrusion 242t of the wavelength conversion member 240 does not overlap with the emission end surface 220a of the light-emitting element 220 in a top view. In this case, at least a portion of the light-shielding film 380 overlaps with the protrusion 242t of the wavelength conversion member 240 in a top view. The emission end surface 220a of the light-emitting element 220 overlaps with the light-shielding film 380 in a top view.

Figure 13:
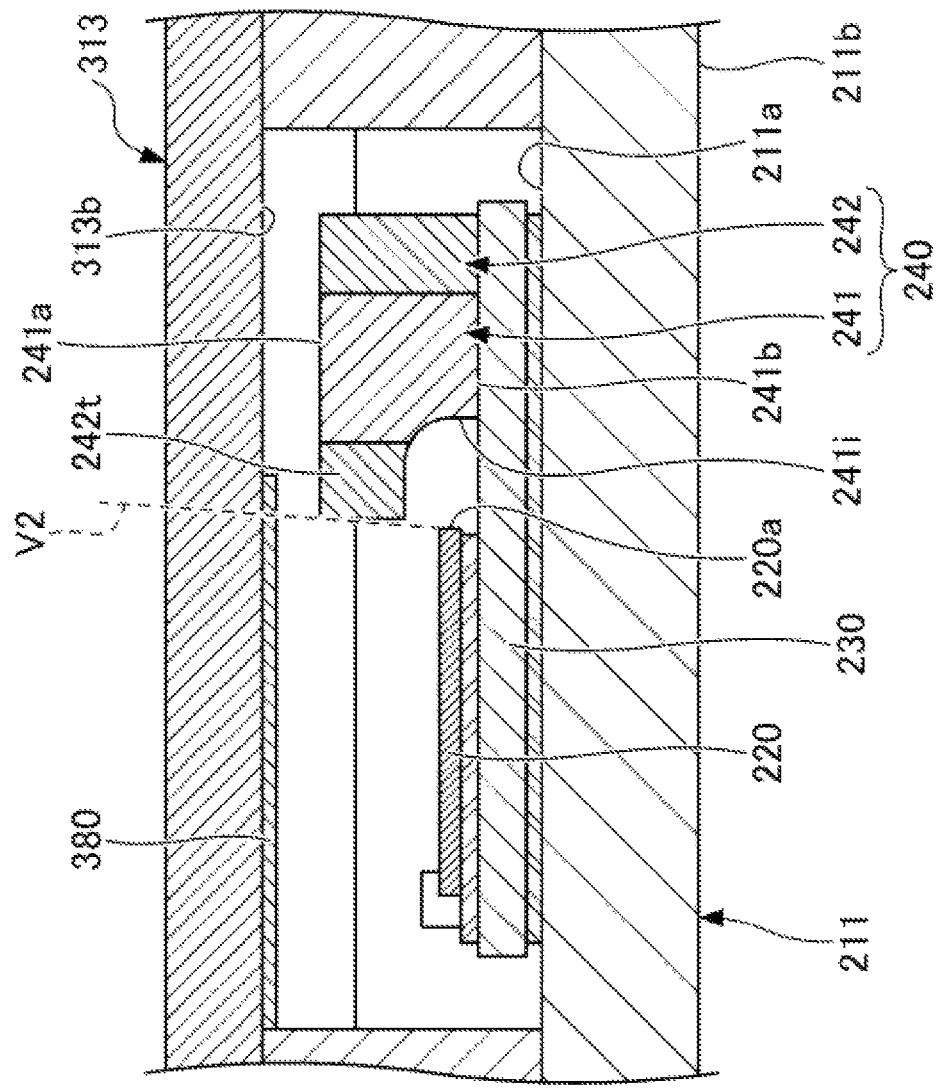
FIG. 13 is a schematic enlarged cross-sectional view of the light-emitting element, the wavelength conversion member, the light-transmissive member, and the vicinity thereof in a modified example of the light-emitting device according to the second embodiment taken along the cutting-plane line XIII-XIII of FIG. 1.

In FIG. 13, the light-shielding region provided with the light-shielding film 380 is located at a position through which a virtual straight line V2 (hereinafter referred to as a virtual line V2) passes. The virtual line V2 connects the upper end of the emission end surface 220a of the light-emitting element 220 and the upper end of the lateral surface of the protrusion 242t located at the extreme end on the second direction side (light-emitting element 220 side). The light-transmissive region is not located on the virtual line V2. The light-shielding region of the lower surface 313b of the light-transmissive member 313 is located on the second direction side (light-emitting element 220 side) with respect to the virtual line V2. The light-shielding region and the light-transmissive region are located in this order on the first direction side (wavelength conversion member 240 side) with respect to the virtual line V2. The light-shielding region is not necessarily located on the first direction side (wavelength conversion member 240 side) with respect to the virtual line V2.

Disposing the light-shielding film 380 at such a position allows for suppression of emission of leaking light out of the light-emitting device 301 even in the case in which the protrusion 242t does not overlap with the emission end surface 220a of the light-emitting element 220 in a top view. Unevenness in color is therefore reduced, and it is possible to provide the light-emitting device 301 that emits highly uniform light. It is also possible to improve the safety of the light-emitting element 220.

In any of the examples of the structure shown in FIGS. 12 and 13, the light-shielding film 380 does not overlap with the upper surface 241a of the wavelength conversion portion 241 in a top view. In other words, in a top view, the wavelength conversion portion 241 overlaps with the light-transmissive region, and the wavelength conversion portion 241 does not overlaps with the light-shielding region. Such an arrangement allows for reduction of the possibility that a portion of light emitted from the wavelength conversion portion 241 is blocked to reduce the light extraction efficiency of the light-emitting devices 300 and 301 due to a narrow light-transmissive region.

Third Embodiment

Next, a light emitting device 400 according to a third embodiment will be described with reference to FIGS. 6 to 8 and FIGS. 14 to 21. The light emitting device 400 is different from the light emitting devices 200 and 300 according to other embodiments in that inner lateral surfaces of the frame member 412 have a stepped shape in a top plan view.

Figure 14:
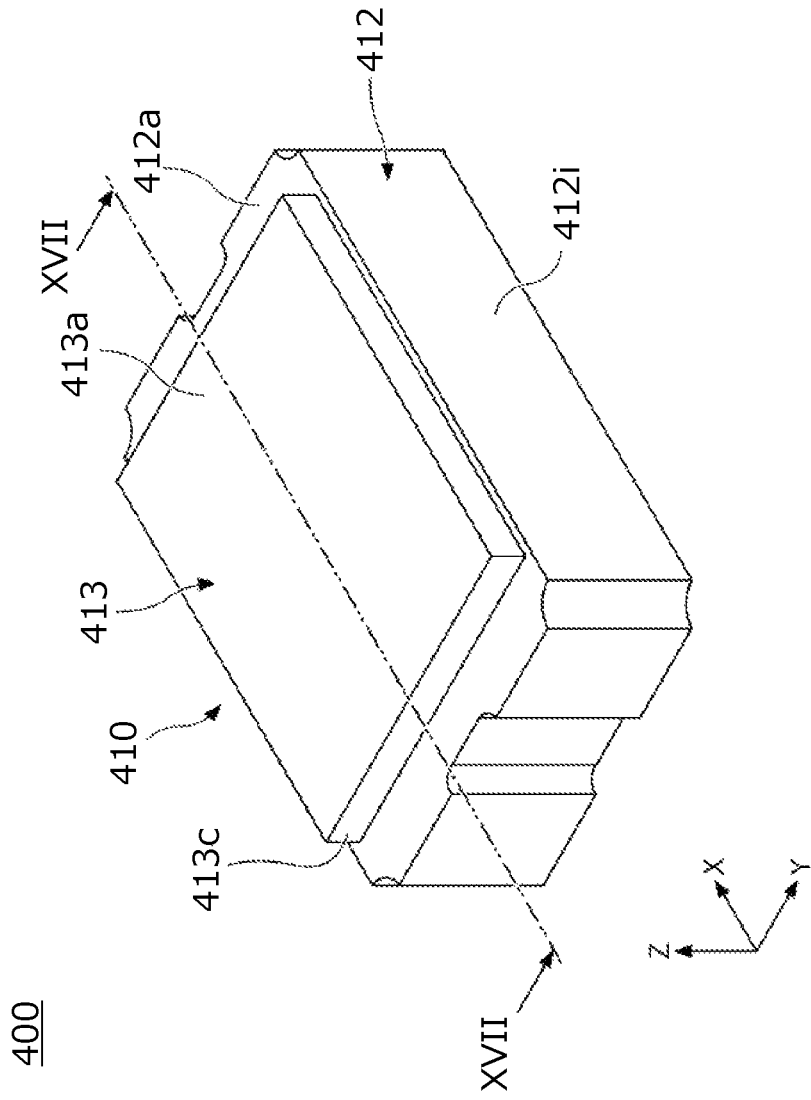
FIG. 14 is a schematic perspective view illustrating a light emitting device according to a third embodiment.
Figure 15:
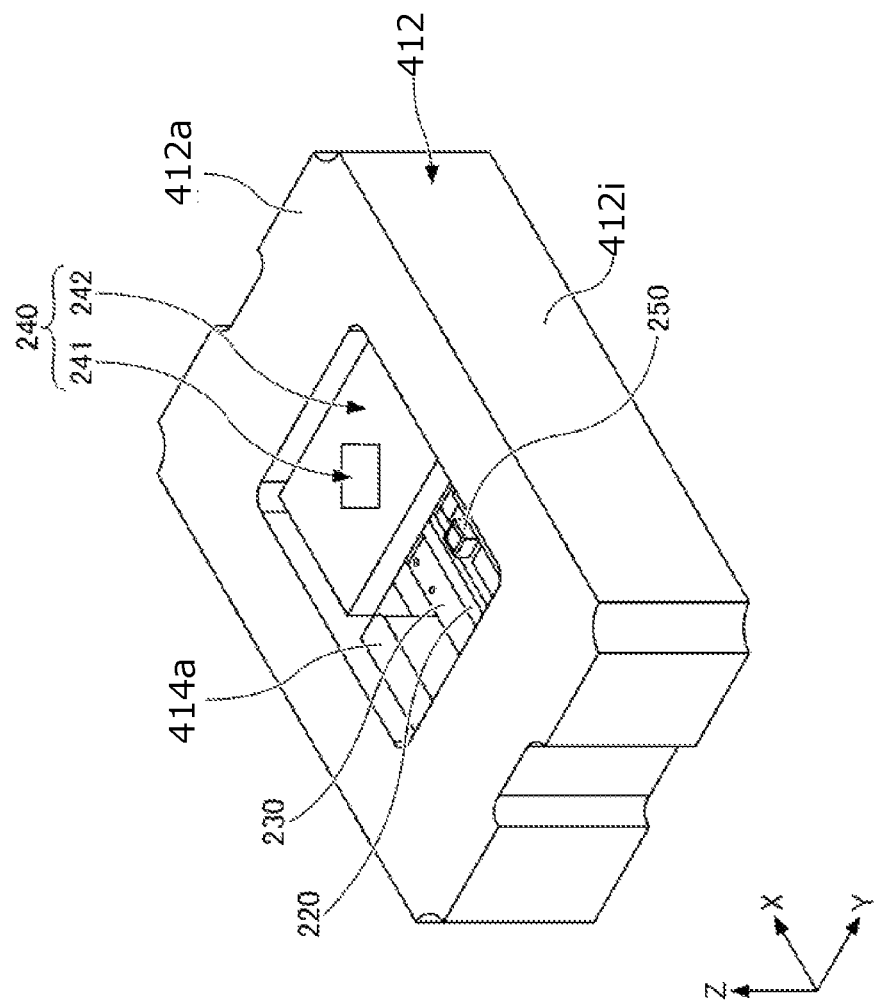
FIG. 15 is a schematic perspective view illustrating an internal structure of the light emitting device according to the third embodiment.
Figure 16:
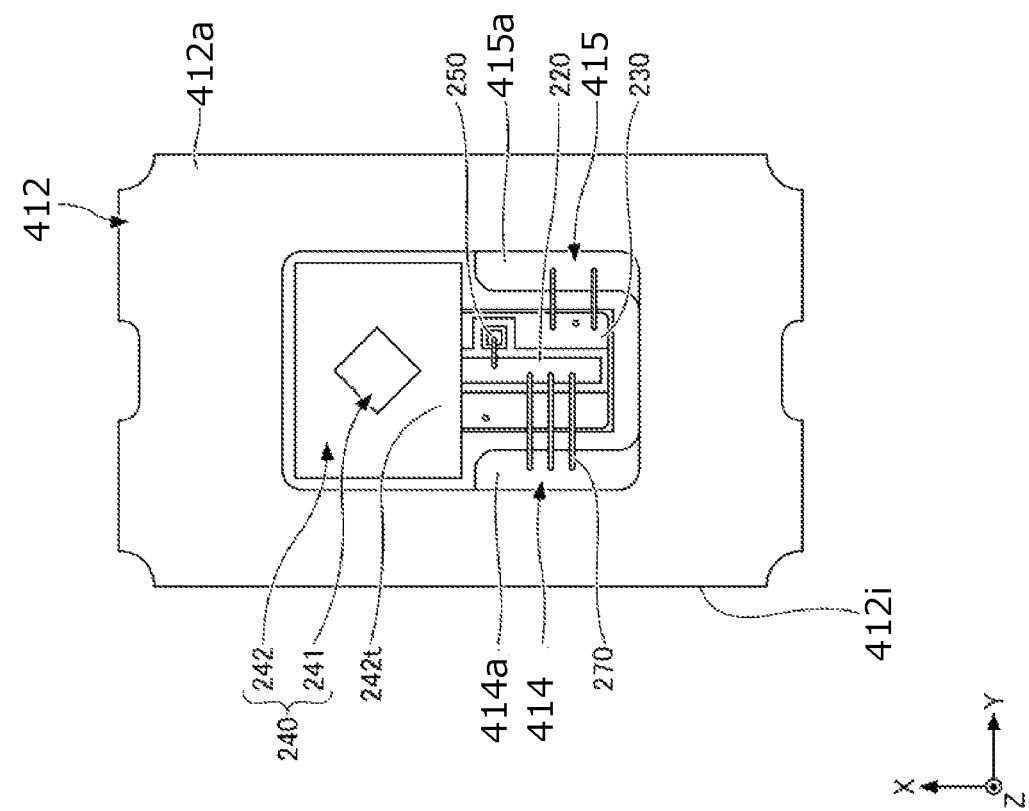
FIG. 16 is a schematic top view illustrating the internal structure of the light emitting device according to the third embodiment.
Figure 17:
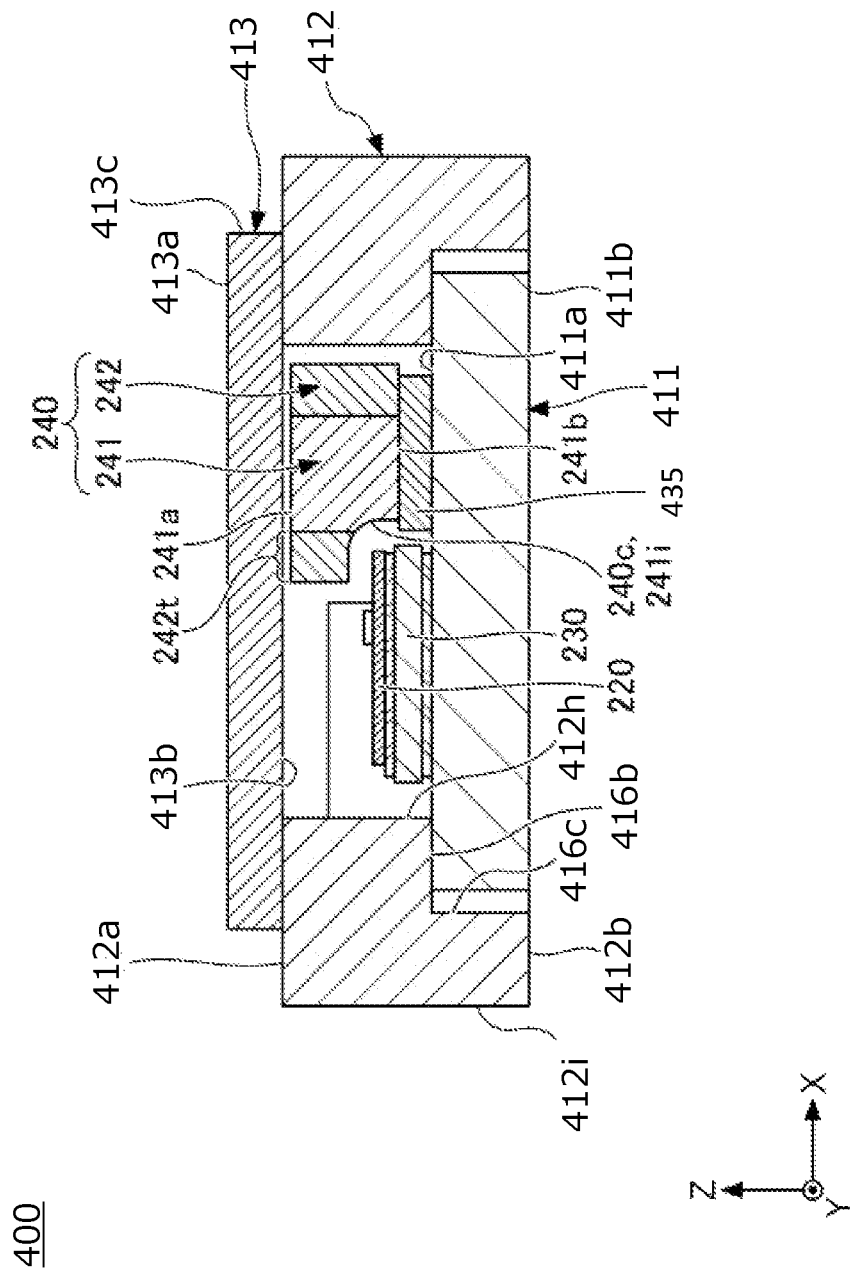
FIG. 17 is a schematic cross-sectional view taken along the line XVII-XVII in FIG. 14 and illustrating the light emitting device according to the third embodiment.
Figure 18:
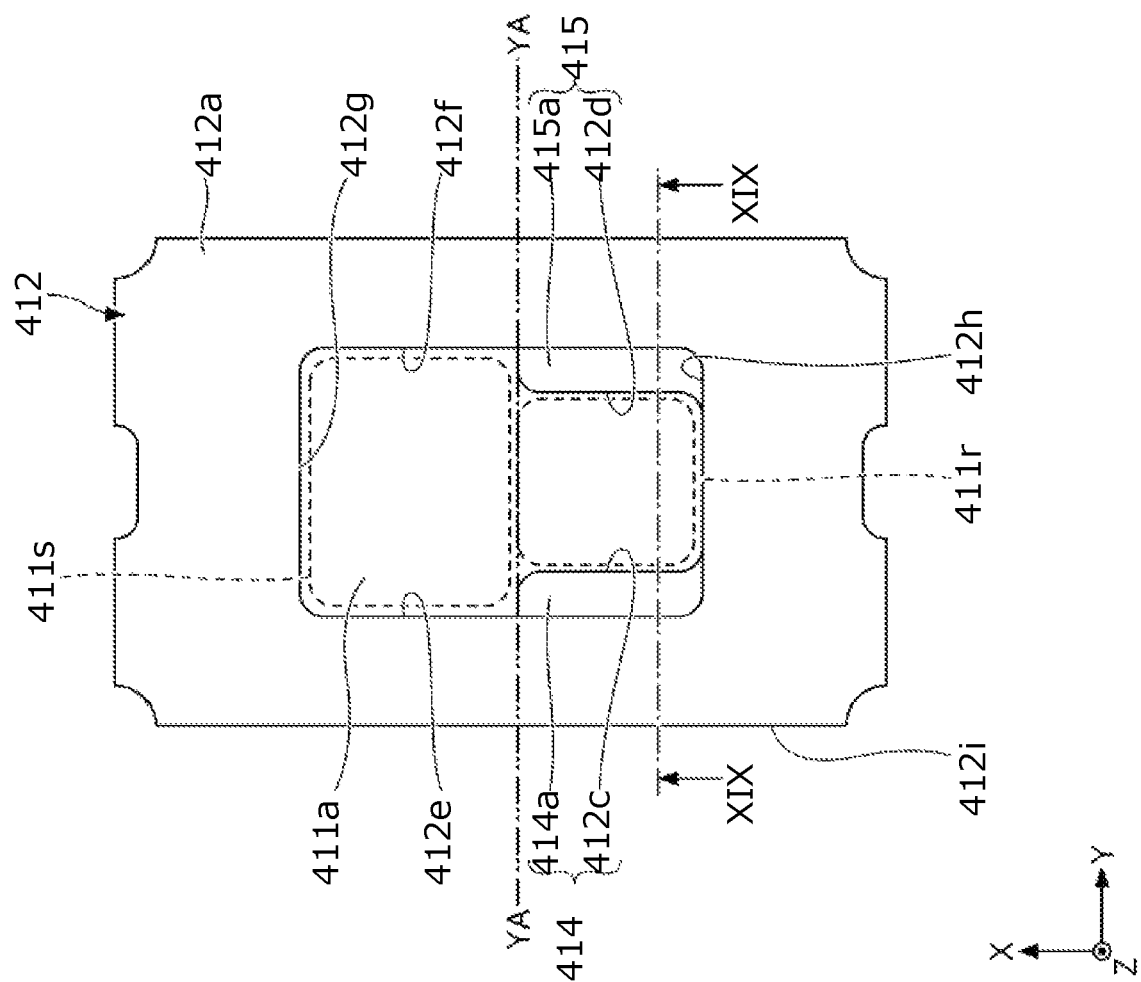
FIG. 18 is a schematic top view illustrating a base member and a frame member of the light emitting device according to the third embodiment.
Figure 19:
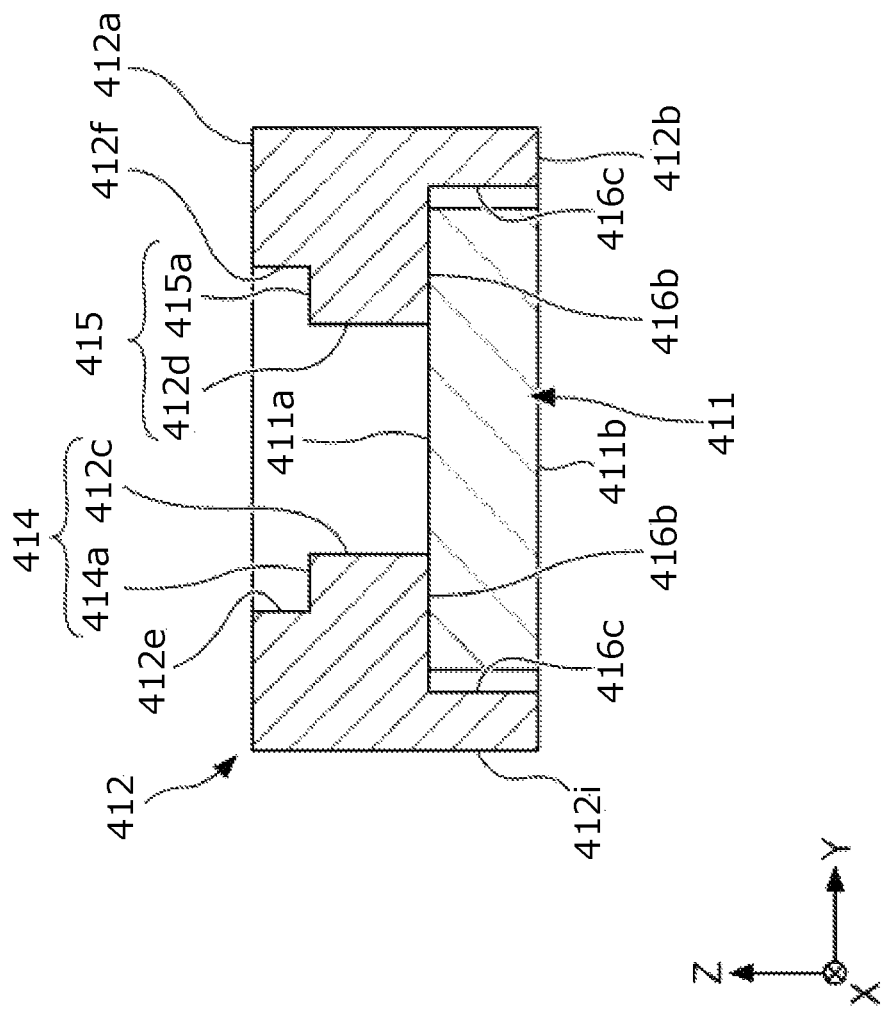
FIG. 19 is a schematic cross-sectional view taken along the line XIX-XIX in FIG. 18 and illustrating the base member and the frame member in FIG. 18.
Figure 20:
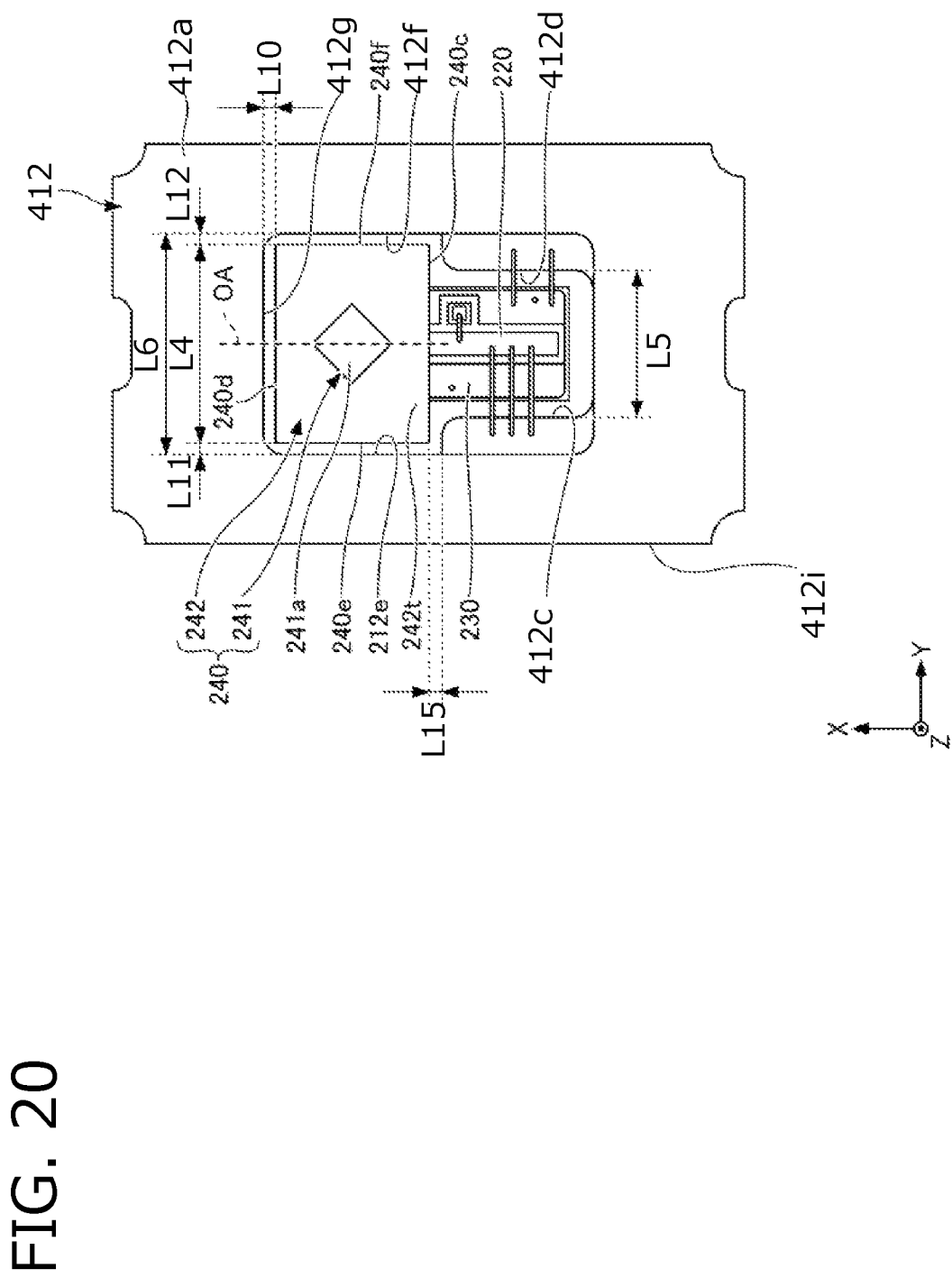
FIG. 20 is a schematic top view corresponding to FIG. 16 for describing further details of a wavelength conversion member and a light emitting element of the light emitting device according to the third embodiment.
Figure 21:
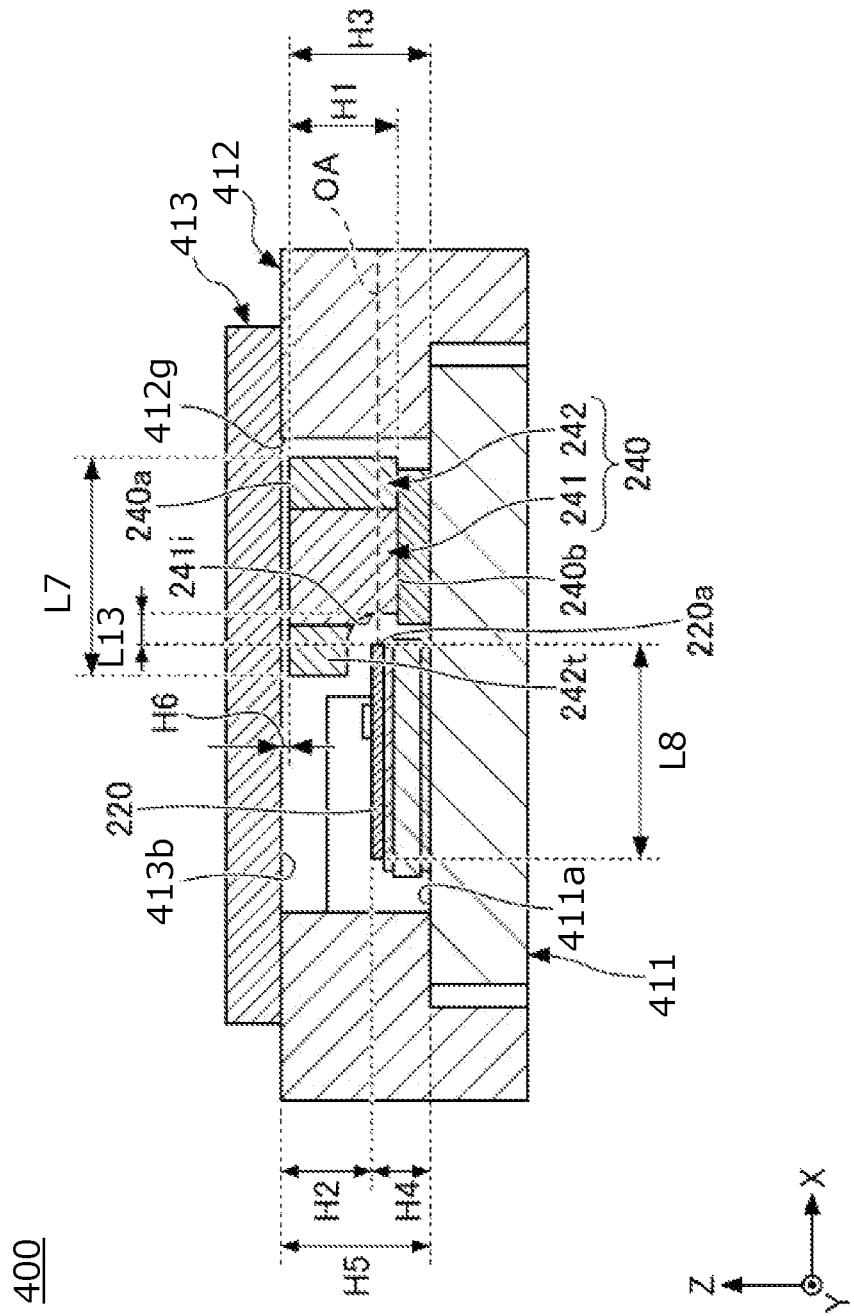
FIG. 21 is a schematic cross-sectional view corresponding to FIG. 17 for describing further details of the wavelength conversion member and the light emitting element of the light emitting device according to the third embodiment.

FIG. 14 is a schematic perspective view illustrating an example of a light emitting device 400. FIG. 15 is a schematic perspective view illustrating an internal structure of the light emitting device 400. For convenience of description, illustration of wirings 270, shown in FIG. 16, are omitted in FIG. 15. FIG. 16 is a schematic top view illustrating the internal structure of the light emitting device 400. FIG. 17 is a schematic cross-sectional view taken along the line XVII-XVII in FIG. 14 and illustrating the example of the light emitting device 400. FIG. 18 is a schematic top view illustrating a base member 411 and a frame member 412. FIG. 19 is a schematic cross-sectional view taken along the line XIX-XIX in FIG. 18 and illustrating the base member 411 and the frame member 412 in FIG. 18. FIG. 20 is a schematic top view corresponding to FIG. 16 for describing further details of a wavelength conversion member 240 and a light emitting element 220 of the light emitting device 400. FIG. 21 is a schematic cross-sectional view corresponding to FIG. 17 for describing further details of the wavelength conversion member 240 and the light emitting element 220 of the light emitting device 400. In FIGS. 14 through 21, an X-axis, a Y-axis, and a Z-axis orthogonal to each other are illustrated for reference. Directions parallel to the X-axis, the Y-axis, and the Z-axis are defined as an X-axis direction, a Y-axis direction, and a Z-axis direction, respectively. The X-axis direction and the Y-axis direction are parallel to the upper surface 411a of the base member 411, and the Z-axis direction is perpendicular to the upper surface 411a of the base member 411.

Package 410

The package 410 includes the base member 411, the frame member 412, and a cover 413. The base member 411 has the upper surface 411a and a lower surface 411b. The base member 411 has a rectangular outer shape in the top view. The rectangle may be a rectangle having long sides and short sides. The outer shape of the base member 411 in the top view is not necessarily rectangular. The term "rectangle" in the present specification also includes a square unless specifically stated to exclude a square.

The frame member 412 is connected to the upper surface 411a of the base member 411 and extends upward from the upper surface 411a. The frame member 412 has one or more upper surfaces, a first lower surface 412b, a plurality of inner lateral surfaces, and one or more outer lateral surfaces 412i. The one or more upper surfaces of the frame member 412 include a first upper surface 412a meeting the one or more outer lateral surfaces 412i. The outer perimeter shape of the first upper surface 412a is, for example, rectangular. The inner perimeter shape of the first upper surface 412a is, for example, a rectangle. A plurality of inner lateral surfaces of the frame member 412 meet the upper surface 411a of the base member 411.

The base member 411 and the frame member 412 form a recess depressed from the first upper surface 412a of the frame member 412 toward the upper surface 411a of the base member 411. The recess is formed at a location inward of an outer periphery of the frame member 412 in the top view. In the top view, the upper surface 411a of the base member 411 is surrounded by a frame formed by a plurality of inner lateral surfaces of the frame member 412. The shape of the frame is a rectangle having long sides and short sides.

The base member 411 and the frame member 412 are formed separately and bonded together. Alternatively, the base member 411 and the frame member 412 may be formed together as a single seamless piece.

In the package 410, stepped portions are formed inside the frame member 412. Specifically, the frame member 412 has a first stepped portion 414 and/or a second stepped portion 415 that are step-shaped in the top view. In the example illustrated in FIGS. 16, 18, and 19, the frame member 412 has a second upper surface 414a and a third upper surface 415a along the two edges, extending in the X-axis direction, of the inner perimeter of the first upper surface 412a. In the top view, the second upper surface 414a extends along one of the two edges, extending in the X direction, of the first upper surface 412a. In the top view, the third upper surface 415a extends along the other of the two edges, extending in the X direction, of the first upper surface 412a. The second upper surface 414a and the third upper surface 415a of the frame member 412 do not extend over the entire length of the two respective edges extending in the X-axis direction. The second upper surface 414a and the third upper surface 415a extend along only a portion of the two respective edges extending in the X-axis direction. In the illustrated example, both the second upper surface 414a and the third upper surface 415a are provided toward the negative X direction in the X-axis direction.

The frame member 412 further has one or more inner lateral surfaces meeting the second upper surface 414a and extending downward. The one or more inner lateral surfaces include a first inner lateral surface 412c that meets the second upper surface 414a. The first inner lateral surface 412c meets the upper surface 411a of the base member 411. In the illustrated example, the plurality of edges at which the first inner lateral surface 412c and the second upper surface 414a meet each other include an edge extending in the X-axis direction and an edge extending in the Y-axis direction in the top view. A curved line is further provided between the edge extending in the X-axis direction and the edge extending in the Y-axis direction. Similarly, the edges at which the first inner lateral surface 412c and the upper surface 411a of the base member 411 meet each other include an edge extending in the X-axis direction and an edge extending in the Y-axis direction in the top view. A curved line is further provided between the edge extending in the X-axis direction and the edge extending in the Y-axis direction. The first inner lateral surface 412c does not meet the first upper surface 412a.

The frame member 412 has one or more inner lateral surfaces meeting the third upper surface 415a and extending downward. The one or more inner lateral surfaces include a second inner lateral surface 412d meeting the third upper surface 415a. The second inner lateral surface 412d meets the upper surface 411a of the base member 411. In the illustrated example, the plurality of edges at which the second inner lateral surface 412d and the third upper surface 415a meet each other include an edge extending in the X-axis direction and an edge extending in the Y-axis direction in the top view. A curved line is further provided between the edge extending in the X-axis direction and the edge extending in the Y-axis direction. Similarly, the edges at which the second inner lateral surface 412d and the upper surface 411a of the base member 411 meet each other include an edge extending in the X-axis direction and an edge extending in the Y-axis direction in the top view. A curved line is further provided between the edge extending in the X-axis direction and the edge extending in the Y-axis direction. The second inner lateral surface 412d does not meet the first upper surface 412a. Alternatively, when the frame member 412 has only the first stepped portion 414 and does not have the second stepped portion 415, the second inner lateral surface 412d connects the first upper surface 412a and the upper surface 411a of the base member 411. In this case, the frame member 412 does not have a fourth inner lateral surface 412f, which will be described later.

The second upper surface 414a and the third upper surface 415a are located further inside than the inner perimeter of the first upper surface 412a in the top view. In the illustrated example, the second upper surface 414a and the third upper surface 415a are located above the upper surface 411a of the base member 411 and below the first upper surface 412a of the frame member 412. The second upper surface 414a and the third upper surface 415a are, for example, parallel to the upper surface 411a of the base member 411. The second upper surface 414a and the third upper surface 415a may alternatively be at the same height as the first upper surface 412a. The first inner lateral surface 412c and the second inner lateral surface 412d each have a portion facing each other in the Y-axis direction. The portion of the first inner lateral surface 412c and the portion of the second inner lateral surface 412d facing each other meet the second upper surface 414a at an edge thereof extending in the X-axis direction and the third upper surface 415a at an edge thereof extending in the X-axis direction, respectively.

By referring to FIGS. 16, 18, and 19, a plurality of inner lateral surfaces of the frame member 412 will be further described. The plurality of inner lateral surfaces of the frame member 412 may further include a third inner lateral surface 412e and a fourth inner lateral surface 412f facing each other in the Y-axis direction. The third inner lateral surface 412e meets the first upper surface 412a at an edge thereof extending in the X-axis direction, and extends downward. The third inner lateral surface 412e meets the upper surface 411a of the base member 411. The third inner lateral surface 412e also meets the second upper surface 414a. Similarly, the fourth inner lateral surface 412f meets the first upper surface 412a at the opposite edge thereof extending in the X-axis direction, and extends downward. The fourth inner lateral surface 412f meets the upper surface 411a of the base member 411. The fourth inner lateral surface 412f also meets the third upper surface 415a. When the second upper surface 414a and the third upper surface 415a are at the same height as the first upper surface 412a, the third inner lateral surface 412e meets the second upper surface 414a at a point on the edge of the first upper surface 412a extending in the X direction. Similarly, the fourth inner lateral surface 412f meets the third upper surface 415a at a point on the other edge of the first upper surface 412a extending in the X direction.

The third inner lateral surface 412e and the fourth inner lateral surface 412f oppose each other in the Y-axis direction. The first inner lateral surface 412c and the third inner lateral surface 412e are located on the same side as one of the two edges extending in the X-axis direction. The second inner lateral surface 412d and the fourth inner lateral surface 412f are located on the same side as the other edge.

The plurality of inner lateral surfaces of the frame member 412 further include a fifth inner lateral surface 412g connected to the third inner lateral surface 412e and the fourth inner lateral surface 412f, and a sixth inner lateral surface 412h facing the fifth inner lateral surface 412g in the X-axis direction. The fifth inner lateral surface 412g meets the first upper surface 412a and extends downward. The fifth inner lateral surface 412g meets the upper surface 411a of the base member 411. The fifth inner lateral surface 412g meets neither the first inner lateral surface 412c nor the second inner lateral surface 412d. The sixth inner lateral surface 412h meets the first upper surface 412a and extends downward. The sixth inner lateral surface 412h meets the upper surface 411a of the base member 411. The sixth inner lateral surface 412h meets the first inner lateral surface 412c and the second inner lateral surface 412d. The third inner lateral surface 412e and the fourth inner lateral surface 412f are, for example, perpendicular to the Y-axis direction. The fifth inner lateral surface 412g and the sixth inner lateral surface 412h are, for example, perpendicular to the X-axis direction. The first inner lateral surface 412c has a portion facing the fifth inner lateral surface 412g in the X-axis direction. Further, the second inner lateral surface 412d has a portion facing the fifth inner lateral surface 412g in the X-axis direction. These portions meet the second upper surface 414a at the edge thereof extending in the Y-axis direction and the third upper surface 415a at the edge thereof extending in the Y-axis direction, respectively.

The upper surface 411a of the base member 411 has a portion exposed inside the frame member 412. The upper surface 411a of the base member 411 includes a first arrangement region 411r and a second arrangement region 411s. In the top view, the first arrangement region 411r extends between the edge, extending in the X-axis direction, at which the first inner lateral surface 412c meets the upper surface 411a and the edge, extending in the X-axis direction, at which the second inner lateral surface 412d meets the upper surface 411a. In the top view, the second arrangement region 411s extends between the edge at which the third inner lateral surface 412e meets the upper surface 411a and the edge at which the fourth inner lateral surface 412f meets the upper surface 411a.

To be more specific, the first arrangement region 411r is located closer in the X-axis direction to the sixth inner lateral surface 412h than the edge at which the first inner lateral surface 412c and the third inner lateral surface 412e meet each other. The first arrangement region 411r does not extend toward the fifth inner lateral surface 412g beyond the edge at which the first inner lateral surface 412c and the third inner lateral surface 412e meet each other. The second arrangement region 411s is located closer in the X-axis direction to the fifth inner lateral surface 412g than the edge at which the first inner lateral surface 412c and the third inner lateral surface 412e meet each other. The second arrangement region 411s does not extend toward the sixth inner lateral surface 412h beyond the edge at which the first inner lateral surface 412c and the third inner lateral surface 412e meet each other.

A plane YA is set that includes both the edge at which the first inner lateral surface 412c meets the third inner lateral surface 412e and a straight line that meets this edge and that extends parallel to the Y-axis direction. In the illustrated example, the plane YA includes the edge at which the second inner lateral surface 412d meets the fourth inner lateral surface 412f. The first arrangement region 411r is defined, in the plan view, by the plane YA, the first inner lateral surface 412c, the second inner lateral surface 412d, and the sixth inner lateral surface 412h on the upper surface 411a of the base member 411. The second arrangement region 411s is defined, in the plan view, by the plane YA, the third inner lateral surface 412e, the fourth inner lateral surface 412f, and the fifth inner lateral surface 412g on the upper surface 411a of the base member 411.

In the top view, the length of the second upper surface 414a in the X-axis direction is shorter than, for example, half of the length of the third inner lateral surface 412e in the X-axis direction. In the top view, the length of the third upper surface 415a in the X-axis direction is shorter than, for example, half of the length of the fourth inner lateral surface 412f in the X-axis direction.

The first stepped portion 414 and the second stepped portion 415 will be described in the following. The first stepped portion 414 refers to a stepped portion formed in the top view by a portion of the edge at which the first upper surface 412a and the third inner lateral surface 412e meet each other and the plurality of edges at which the second upper surface 414a and the first inner lateral surface 412c meet each other. The "portion of the edge at which the first upper surface 412a and the third inner lateral surface 412e meet each other" in the example herein indicates the portion located at a side of the positive direction of the X-axis direction with respect to the plane YA.

Similarly, the second stepped portion 415 refers to a stepped portion formed in the top view by a portion of the edge at which the first upper surface 412a and the fourth inner lateral surface 412f meet each other and the plurality of edges at which the third upper surface 415a and the second inner lateral surface 412d meet each other. The "portion of the edge at which the first upper surface 412a and the fourth inner lateral surface 412f meet each other" in the example herein refers to the portion located at a side of the positive direction of the X-axis direction of the plane YA.

One or more metal films may be provided on the second upper surface 414a and the third upper surface 415a. One or more metal films may also be provided on the first upper surface 412a. The one or more metal films provided on the second upper surface 414a and/or the third upper surface 415a may include a metal film electrically connected to a metal film provided on the first upper surface 412a. The metal films may be, for example, Ni/Au (i.e., metal films formed by laminating Ni and Au in this order), Ti/Pt/Au (i.e., metal films formed by laminating Ti, Pt, and Au in this order), or the like.

As illustrated in FIG. 19, the frame member 412 may further have a second lower surface 416b located opposite to the second upper surface 414a and the third upper surface 415a. The second lower surface 416b is bonded to the upper surface 411a of the base member 411 via, for example, a metal adhesive. In the illustrated example, the second lower surface 416b overlaps a portion of the first upper surface 412a in the top view. The frame member 412 may further have one or more lateral surfaces 416c meeting the second lower surface 416b and extending downward. The lateral surfaces 416c further meet the first lower surface 412b. The second lower surface 416b is parallel to the upper surface 411a of the base member 411, for example. In the illustrated example, the lateral surfaces 416c are located apart from the lateral surface of the base member 411.

As illustrated in FIGS. 14 and 17, the cover 413 has an upper surface 413a, a lower surface 413b, and one or more lateral surfaces 413c meeting the upper surface 413a and the lower surface 413b. The one or more lateral surfaces 413c connect the outer perimeter of the upper surface 413a and the outer perimeter of the lower surface 413b. The cover 413 is, for example, a rectangular parallelepiped or a cube. In this case, the upper surface 413a and the lower surface 413b of the cover 413 are both rectangular, and the cover 413 has four rectangular lateral surfaces 413c.

The cover 413 is not limited to a rectangular parallelepiped or a cube. That is, the shape of the cover 413 in the top view is not limited to a rectangle, and may be any shape such as a circle, an ellipse, or a polygon.

The cover 413 is supported by the frame member 412 and disposed over the upper surface 411a of the base member 411.

The outer peripheral portion of the lower surface 413b of the cover 413 is bonded to the first upper surface 412a of the frame member 412, for example. By bonding the cover 413 and the frame member 412, a sealed space surrounded by the base member 411, the frame member 412, and the cover 413 is formed. The lower surface 413b faces the upper surface 411a of the base member 411 via the sealed space. At least a portion of the lower surface 413b defines the sealed space.

The base member 411 may be formed of, for example, a metal as a main material. For example, copper, a copper alloy, or the like may be used as the metal. The frame member 412 may be formed of, for example, a ceramic as a main material. For example, aluminum nitride, silicon nitride, aluminum oxide, or silicon carbide may be used as the ceramic. Alternatively, both the base member 411 and the frame member 412 may be formed of, for example, a ceramic as a main material, or may be formed of another material having an insulating property as a main material.

The cover 413 may have a light transmission region that transmits light of a predetermined wavelength.

The light transmitting region constitutes part of the upper surface 413a and the lower surface 413b of the cover 413. The light transmitting region of the cover 413 may be formed of, for example, sapphire as a main material. Sapphire is a material having relatively high transmittance and relatively high strength. Alternatively, the main material of the light transmitting region of the cover 413 is not necessarily sapphire, and may be a translucent material including quartz, silicon carbide, glass, or the like.

The portion other than the light transmission region of the cover 413 may be formed of the same material as the light transmission region to be a single seamless piece with the light transmission region.

Submount 430

The submount 430 has, for example, a rectangular parallelepiped shape and has a lower surface, an upper surface, and one or more lateral surfaces. The submount 430 has the smallest dimension in the vertical direction. It may be noted that the shape is not limited to a rectangular parallelepiped. The submount 430 is formed of, for example, aluminum nitride or silicon carbide, although other materials may alternatively be used. In addition, a metal film, for example, is provided on the upper surface of the submount 430.

Submount 435

The submount 435 may be formed of the same material as the submount 430, for example. A material different from that of the submount 430 may alternatively be used.

Wavelength Conversion Member 240

In the light emitting device 400, a wavelength conversion member having the same shape and made of the same material as those of wavelength conversion member 240 in the first embodiment can be used. In the present embodiment, the upper surface 241a of the wavelength conversion portion 241 and the upper surface 242a of the surrounding portion 242 may be collectively referred to as an "upper surface 240A of the wavelength conversion part 240." Similarly, the lower surface 241b and lower surface 242b may be collectively referred to as a "lower surface 240b of the wavelength conversion member 240." Further, the incident lateral surface 241i and the lateral surface 242d of the surrounding portion at the incident lateral surface 241i side may be collectively referred as a "first lateral surface 240c of the wavelength conversion member 240." A lateral surface of the wavelength conversion member 240 opposite to the first lateral surface 240c may be referred to as a "second lateral surface 240d." The wavelength conversion member 340 may further include a third lateral surface 240e and a fourth lateral surface 240f that meet the second side 240d and extend in the X-axis direction.

Light Emitting Device 400

In the following, the light emitting device 400 will be described with reference to FIGS. 6 to 8 and FIGS. 14 to 21.

In the light emitting device 400, the light emitting element 220 and the wavelength conversion member 240 are disposed on the upper surface 411a of the base member 411. In the illustrated example, the light emitting element 220 is disposed on the upper surface 411a via the submount 430. The wavelength conversion member 240 is disposed on the upper surface 411a via the submount 435. As will be described later, the submount 435 has the wavelength conversion member 240 disposed thereon longer than the distance between the first inner lateral surface 412c and the second inner lateral surface 412d, and is thus longer than the submount 430 in the Y-axis direction. In the Z-axis direction, the height of the submount 430 is higher than the height of the submount 435. Accordingly, the light emitted from the light emitting element 220 and traveling downward, in addition to the other emitted light, can be efficiently incident on the wavelength conversion portion 241. The submount 430 and the submount 435 are bonded to the upper surface 411a via, for example, a metal adhesive.

The light emitting element 220 and the wavelength conversion member 240 are surrounded by the frame member 412 at the upper surface 411a of the base member 411. To be more specific, the light emitting element 220 is arranged in the first arrangement region 411r. As in the illustrated example, the light emitting element 220 may extend from the first arrangement region 411r to the second arrangement region 411s. The wavelength conversion member 240 is disposed in the second arrangement region 411s. The wavelength conversion member 240 is not disposed in the first arrangement region 411r. The light emitting element 220 emits directional light in a lateral direction. The light traveling in the lateral direction is directed toward the first lateral surface 240c of the wavelength conversion member 240.

Further, the cover 413 is disposed over the light emitting element 220 and the wavelength conversion member 240. The light emitting element 220 and the wavelength conversion member 240 are disposed in a sealed space formed by the base member 411, the frame member 412, and the cover 413.

In the present specification, the traveling direction of light traveling on the optical axis OA of light emitted from the light emitting element 220 may sometimes be referred to as a "light traveling direction". When one of two members is located upstream of the other member in the light traveling direction, the other member is referred to as being located "on the light traveling direction side" of the one member. In the illustrated example, the "light traveling direction" coincides with the positive X direction, and the one member being positioned "on the light traveling direction side" of the other member is the same as the one member being positioned further in the positive X direction than the other member. The optical axis OA of light emitted from the light emitting element 220 is, for example, parallel to the first inner lateral surface 412*c* and the second inner lateral surface 412*d*. The optical axis OA is, for example, perpendicular to the fifth inner lateral surface 412*g* and the sixth inner lateral surface 412*h*.

The light emitting element 220 is disposed such that the emission end surface 220*a* thereof faces in the same direction as one lateral surface of the submount 430. The emission end surface 220*a* of the light emitting element 220 is, for example, perpendicular to the first inner lateral surface 412*c* of the frame member 412.

One of the two lateral surfaces of the light emitting element 220 meeting the emission end surface 220*a* faces the first inner lateral surface 412*c* of the frame member 412. The one of the two lateral surfaces of the light emitting element 220 meeting the emission end surface 220*a* is, for example, parallel to the first inner lateral surface 412*c*. The other one of the two lateral surfaces of the light emitting element 220 meeting the emission end surface 220*a* faces the second inner lateral surface 412*d* of the frame member 412. The other one of the two lateral surfaces of the light emitting element 220 meeting the emission end surface 220*a* is, for example, parallel to the second inner lateral surface 412*d*.

The wavelength conversion member 240 is disposed such that the first lateral surface 240*c* faces the light emitting element 220. To be more specific, the first lateral surface 240*c* faces the emission end surface 220*a* of light emitting element 220. In the illustrated example, the outer lateral surface of the protrusion 242*t* does not face the light emitting element 220. In the illustrated example, the protrusion 242*t* is disposed such as to overlap the light emitting element 220 in the top view. Accordingly, even when the submount 430 having the light emitting element 220 disposed thereon falls off and light is emitted upward, the light can be reflected by the protrusion 242*t*.

Further, the incident lateral surface 241*i* of the wavelength conversion portion 241 constituting a portion of the first lateral surface 240*c* faces the emission end surface 220*a* of the light emitting element 220. The light emitted from the emission end surface 220*a* and traveling sideways enters the incident lateral surface 241*i*. At least a portion of the incident lateral surface 241*i* is located below the optical axis OA. The light incident on the incident lateral surface 241*i* is emitted from, for example, the upper surface 241*a*. The light emitted from the upper surface 241*a* includes light entering the wavelength conversion portion 241 and then reflected by the surrounding portion 242 to enter the wavelength conversion portion 241 again. In the example illustrated in FIGS. 6 to 8 and FIGS. 14 to 21, the upper surface 241*a* of the wavelength conversion portion 241 serves as the exit surface of the wavelength conversion member 240. In the case in which the wavelength conversion portion 241 is a wavelength conversion portion including a phosphor, light incident on the incident lateral surface 241*i* is emitted upwards upon undergoing wavelength conversion.

The wavelength conversion member 240 has the second lateral surface 240*d* opposite to the first lateral surface 240*c*. The second lateral surface 240*d* faces another component. The surface of the other component facing the second lateral surface 240*d* is referred to as a first opposing surface. In other words, the light emitting device 400 has a first opposing surface facing the second lateral surface 240*d* of the wavelength conversion member 240. In the example illustrated in FIG. 20, the fifth inner lateral surface 412*g* of the frame member 412 is the first opposing surface.

The first opposing surface is not limited to the fifth inner lateral surface 412*g* of the frame member 412.

Although not illustrated, another component such as a lens may be disposed opposite the light emitting element 220 in the X-axis direction with the wavelength conversion member 240 interposed therebetween.

In such a case, a surface of the component such as the lens facing the second lateral surface 240*d* of the wavelength conversion member 240 constitutes the first opposing surface.

The light emitting device 400 may further include a second opposing surface facing the third lateral surface 240*e* of the wavelength conversion member 240 and a third opposing surface facing the fourth lateral surface 240*f*. In the example illustrated in FIG. 20, the second opposing surface is the third inner lateral surface 412*e* of the frame member 412, and the third opposing surface is the fourth inner lateral surface 412*f* of the frame member 412.

As illustrated in FIG. 20, the length L4 of the wavelength conversion member 240 in the Y-axis direction is longer than the distance L5 between the first inner lateral surface 412*c* and the second inner lateral surface 412*d* of the frame member 412. Such a dimensional relationship restricts the movement of the wavelength conversion member 240 in the X-axis direction even when the wavelength conversion member 240 falls off the base member 411. More specifically, the wavelength conversion member 240 arranged in the second arrangement region 411*s* can be hindered from moving to the first arrangement region 411*r*. In the Y-axis direction, the distance L6 between the third inner lateral surface 412*e* and the fourth inner lateral surface 412*f* is longer than the distance L5 between the first inner lateral surface 412*c* and the second inner lateral surface 412*d*.

As illustrated in FIG. 21, the length H1 of the wavelength conversion member 240 in the Z-axis direction is longer than the distance H2 from the upper surface of the light emitting element 220 to the lower surface 413*b* of the cover 413. With such a dimensional relationship, even when the wavelength conversion member 240 falls off the base member 411, the wavelength conversion member 240 can be prevented from moving in the X-axis direction to climb over the light emitting element 220. In the Z-axis direction, the height H3 of the upper surface 240*a* of the wavelength conversion member 240 from the upper surface 411*a* of the base member 411 is higher than the height H4 of the upper surface of the light emitting element 220 from the upper surface 411*a* of the base member 411. The distance H6 between the upper surface 240*a* of the wavelength conversion member 240 and the lower surface 413*b* of the cover 413 in the Z-axis direction is less than the difference between the thickness of the submount 430 and the thicknesses of the submount 435. Thus, the movement of the wavelength conversion member 240 in the X-axis direction is properly restricted. More specifically, the movement of the wavelength conversion member 240 toward the light emitting element 220 is properly restricted.

As described above, the structure of the light emitting device 400 is such that the movement of the wavelength conversion member 240 is restricted in the X-axis direction and the Z-axis direction even when the wavelength conversion member 240 falls off the base member 411. Therefore, even when the wavelength conversion member 240 falls off the base member 411, the wavelength conversion member 240 continues to stay at such a position as to receive light from the light emitting element 220. As a result, the light emitted from the light emitting element 220 is less likely to be directly emitted to the outside of the light emitting device 400, which enables the realization of a light emitting device 400 having excellent safety features.

In the X-axis direction, the length L7 of the wavelength conversion member 240 is longer than the length L8 of the light emitting element 220. Further, in a side elevation view, the length L9 of the diagonal line of the wavelength conversion member 240 is preferably longer than the distance in the Z-axis direction from the lower surface 240b of the wavelength conversion member 240 to the lower surface 413b of the cover 413. Here, the length of the diagonal line of the wavelength conversion member 240 refers to a line segment connecting a point closest to the light emitting element 220 on the upper surface 240a and a point closest to the first opposing surface on the lower surface 240b (which is, in the illustrated example, the fifth inner lateral surface 412g). This arrangement allows for reducing the movement of the wavelength conversion member 240 in the rotational direction in the side elevation view.

It is preferable that the wavelength conversion member 240 is directly or indirectly fixed to the base member 411 only at the lower surface 240b thereof. In the illustrated example, the lower surface 240b of the wavelength conversion member 240 is in contact with the upper surface of the submount 435. The upper surface and one or more lateral surfaces of the wavelength conversion member 240 are located apart from other members. That is, there is a space between the second lateral surface 240d of the wavelength conversion member 240 and the first opposing surface. There is a space between the third lateral surface 240e and the second opposing surface. There is a space between the fourth lateral surface 240f and the third opposing surface. There is a space between the upper surface 240a and the lower surface 413b of the cover 413.

Since spaces are provided between the lateral surfaces of the wavelength conversion member 240 and the opposing surfaces facing these lateral surfaces as described above, the position of the wavelength conversion member 240 is easily adjusted when mounted in the light emitting device 400. Further, such an arrangement improves the degree of freedom in layout in the light emitting device 400.

In the illustrated example, the lower surface 240b of the wavelength conversion member 240 is bonded to the upper surface of the submount 435 using a bonding member. The upper surface of the submount 435 is not located higher than the lower surface of the light emitting element 220. In the illustrated example, the upper surface of the submount 435 is located lower than the lower surface of the light emitting element 220. As a result, the light emitted from the light emitting element 220 and traveling below the optical axis can be efficiently received by the wavelength conversion portion 241 at the incident lateral surface 241i.

In the illustrated example, in a side elevation view, the end point of the lower surface 240b of the wavelength conversion member 240 located furthest toward the light traveling direction side is located further toward the light traveling direction side than the end point of the upper surface of the submount 435 located furthest to the light traveling direction side. Such an arrangement allows for reducing the distance between the wavelength conversion member 240 and the first opposing surface (fifth inner lateral surface 412g). The end point of the upper surface of the submount 435 located furthest in the second direction (i.e., direction opposite to the light traveling direction) is located on the second direction side with respect to the end point of the lower surface 240b of the wavelength conversion member 240 located furthest in the second direction. With this arrangement, the entire lower surface of the wavelength conversion portion 241 receiving light from the light emitting element 220 is bonded to the upper surface of the submount 435, which thus enables efficient heat dissipation.

In the following, a specific example of a dimensional relationship in the light emitting device 400 will be described. In the X-axis direction, the length L10 of the space between the first opposing surface (in the illustrated example, the fifth inner lateral surface 412g of the frame member 412) and the second lateral surface 240d is 50 μm or more and 400 μm or less. With a length L10 of 50 μm or more, the easiness of mounting and the degree of freedom in layout can be improved. With a length L10 of 400 μm or less, the movement of the wavelength conversion member 240 in the X-axis direction can be reduced.

In the Y-axis direction, each of the length L11 of the space between the third inner lateral surface 412e (second opposing surface) of the frame member 412 and the third lateral surface 240e of the wavelength conversion member 240 and the length L12 of the space between the fourth inner lateral surface 412f (third opposing surface) of the frame member 412 and the fourth lateral surface 240f of the wavelength conversion member 240 is preferably 50 μm or more and 400 μm or less. Setting each of the length L11 and the length L12 to 50 μm or more allows for improving the easiness of mounting and the degree of freedom in layout. Setting each of the length L11 and the length L12 to 400 μm or less allows for reducing the movement of the wavelength conversion member 240 in the Y-axis direction. In the Y-axis direction, further, the length L4 of the wavelength conversion member 240 is preferably not less than 0.6 times, and not more than 0.95 times, the distance L6 between the third inner lateral surface 412e and the fourth inner lateral surface 412f of the frame member 412.

In the Z-axis direction, the length H6 of the space between the upper surface 240a of the wavelength conversion member 240 and the lower surface 413b of the cover 413 is preferably 50 μm or more and 400 μm or less. Having a length H6 of 50 μm or more allows for improving the easiness of mounting and the degree of freedom in layout. Having a length H6 of 400 μm or less allows for reducing the movement of the wavelength conversion member 240 in the Z-axis direction. In the Z-axis direction, further, the length H1 of the wavelength conversion member 240 is preferably not less than 0.05 times, and not more than times, the distance H5 from the upper surface 240a of the wavelength conversion member 240 to the lower surface 413b of the cover 413, and is more preferably not less than times, and not more than 0.95 times, the distance H5.

In the X-axis direction, the length L7 of the wavelength conversion member 240 is preferably not less than 0.5 times, and not more than 1.1 times, the distance from the emission end surface 220a of the light emitting element 220 to the fifth inner lateral surface 412g of the frame member 412. In the X-axis direction, the distance L13 from the incident lateral surface 241i to the emission end surface 220a of the light emitting element 220 is preferably 5 μm or more and 1000 μm or less. The distance L13 is more preferably 400 μm or less.

The wavelength conversion member 240 may be configured such that the length of the upper surface 240a in the X-axis direction is, for example, 20 μm or more and 3000 μm or less. The length of the upper surface 240a in the Y-axis direction may be 20 μm or more and 3000 μm or less. The length from the upper surface 240a to the lower surface 240b in the Z-axis direction may be 20 μm or more and 3000 μm or less.

In the side elevation view, the cross-sectional area of the wavelength conversion member 240 taken along the XZ plane passing through the midpoint of the edge extending in the Y-axis direction of the upper surface 240a is preferably larger than the cross-sectional area of the light emitting element 220 taken along the XZ plane passing through the midpoint of the edge extending in the Y-axis direction of the upper surface thereof. Further, the volume of the wavelength conversion member 240 is preferably larger than the volume of the light emitting element 220. Moreover, the volume of the sealed space defined by the base member 411, the frame member 412, and the cover 413 of the package 410 does not exceed 20 times the volume of the wavelength conversion member 240. Preferably, the volume of the sealed space is equal to or less than 10 times the volume of the wavelength conversion member 240.

In the top view, the length of the diagonal line of the upper surface 240a of the wavelength conversion member 240 is longer than the length L6. With such a length, the movement of wavelength conversion member 240 in the rotational direction in the XY plane can be reduced. To be more specific, the diagonal line of the upper surface 240a of the wavelength conversion member 240 is allowed to rotate only up to 30 degrees or less in the rotational direction in the XY plane in the top view.

Light (first light) emitted from the light emitting element 220 is incident on the incident lateral surface 241i of the wavelength conversion portion, and is converted into light (second light) having a different wavelength from the first light by the wavelength conversion portion. The first light having entered the incident lateral surface 241i is emitted from the upper surface 241a. Also, the second light after the conversion is emitted from the upper surface 241a. The first light and the second light are emitted upward from the upper surface 241a of the wavelength conversion portion 241. In this manner, the wavelength conversion member having the light incident surface on the lateral side thereof and the light emitting surface on the upper side thereof is provided, thereby realizing wavelength conversion and optical path conversion from the lateral direction to the upper direction.

In the top view, the upper surface 241a of the wavelength conversion portion 241 may be symmetric with respect to the optical axis OA. Further, the upper surface of the surrounding portion 242 may be symmetric with respect to the optical axis OA in the top view. The direction of the optical axis OA is parallel to the X-axis direction.

In the illustrated example, the protrusion 242t protrudes further toward the light emitting element 220 than the end of the lower surface 240b of the wavelength conversion member 240 located at the light emitting element 220 side. The protrusion 242t is preferably disposed such as to overlap the emission end surface 220a of the light emitting element 220 in the top view. The protrusion 242t is more preferably disposed such as to overlap the entire emission end surface 220a of the light emitting element 220 in the top view.

The second upper surface 414a and/or the third upper surface 415a are higher than the height of the upper surface of the light emitting element 220, as measured from the upper surface 411a of the base member 411, for example. In the illustrated example, the second upper surface 414a and/or the third upper surface 415a are at a position lower than the height of the upper surface 240a of the wavelength conversion member 240, as measured from the upper surface 411a of the base member 411, for example. Similarly, the second upper surface 414a and/or the third upper surface 415a are at a position lower than the upper surface 241a of the wavelength conversion portion 241, as measured from the upper surface 411a. The second upper surface 414a and/or the third upper surface 415a are higher than the lower surface of the wavelength conversion member 240 belonging to the protrusion 242t, as measured from the upper surface 411a. Since the upper surface 240a of the wavelength conversion member 240 is at a position higher than the second upper surface 414a and/or the third upper surface 415a, an increase in the length of H6 can be reduced. Further, since the lower surface of the wavelength conversion member 240 belonging to the protrusion 242t is at a position lower than the second upper surface 414a and/or the third upper surface 415a, any movement of the wavelength conversion member 240 toward the light emitting element 220 causes the protrusion to come in contact with the first inner lateral surface 412c and/or the second inner lateral surface 412d. Accordingly, it is possible to improve the effect of restricting the movement of the wavelength conversion member 240 in the X-axis direction.

In the X-axis direction, the distance L15 from the end of the protrusion 242t of the wavelength conversion member 240 to the end of the first inner lateral surface 412c of the frame member 412 on the side closer to the emission end surface 220a is smaller than the distance L13. With such a distance, if the wavelength conversion member 240 falls off, the protrusion 242t comes into contact with the first inner lateral surface 412c before the incident lateral surface 241i comes into contact with the emission end surface 220a. The light emitting device can thus be configured to further restrict the movement of the wavelength conversion member 240. The distance L15 is, for example, 30 μm or more and 500 μm or less. 30 μm is the shortest possible distance at which the end of the protrusion 242t and the end of the first inner lateral surface 412c can be brought close to each other in the X-axis direction. Further, by setting the distance between the end of the protrusion 242t and the end of the first inner lateral surface 412c to 500 μm or less in the X-axis direction, it is possible to reduce the misalignment of the wavelength conversion member 240 in the rotation direction in the top view.

In the light emitting device 400, the light emitting element 220 and the protective element 250 are electrically connected to the metal films provided on the base member 411 and/or the frame member 412 by one or more of the wirings 270. Such one or more wirings 270 of the light emitting device 400 illustrated in the drawings are those of a specific example in which the protective element 250 is a Zener diode. In a case in which the protective element 250 is a temperature measuring element, wire connections may possibly be different from the illustrated example.

The light emitting element 220 is electrically connected to the metal film provided on the second upper surface 414a and/or the third upper surface 415a via some of the wires 270. As is illustrated, the light emitting device 400 includes a plurality of wires 270. These wires 270 include wires 270 that have one of the two opposite ends thereof bonded to the second upper surface 414a and the other end thereof bonded to the upper surface of the light emitting element 220, and also include wires 270 that have one of the two opposite ends thereof bonded to the third upper surface 415a and the other end thereof bonded to the submount 430.

The electrical connection between the light emitting element 220 and an external power supply may be provided through the metal film provided on the lower surface 411b of the base member 411 and/or the first lower surface 412b of the frame member 412. The metal film provided on the lower surface 411b and/or the first lower surface 412b may be electrically connected to the metal film provided on the second upper surface 414a and/or the third upper surface 415a through a metal material provided in via holes, and thereby establishes electrical connection between the light emitting element 220 and the external power supply.

The cover 413 has the light transmission region through which light emitted from the upper surface 240a of the wavelength conversion member 240 is transmitted and emitted to the outside. The entire lower surface 413b of the cover 413 may serve as a light incident surface, and the entire cover 413 may be the light transmission region. The light transmission region of the cover 413 preferably transmits 50% or more, more preferably 70% or more, of the light emitted from the light emitting element 220 and the light emitted from the wavelength conversion member 240. There may be a case in which only a part of the cover 413 constitutes a light transmission region.

The cover 413 may include a light shielding portion. The light shielding portion prevents light from entering the lower surface 413b or light from exiting from the upper surface 413a. The light shielding portion constitutes part of the upper surface 413a or the lower surface 413b of the cover 413. The light shielding portion may be partially provided on, for example, the upper surface 413a and/or the lower surface 413b of the cover 413. The light shielding portion may be formed, for example, by using a light shielding material including a metal or the like to form a portion other than the light transmission region of the cover 413.

Fourth Embodiment

Figure 22:
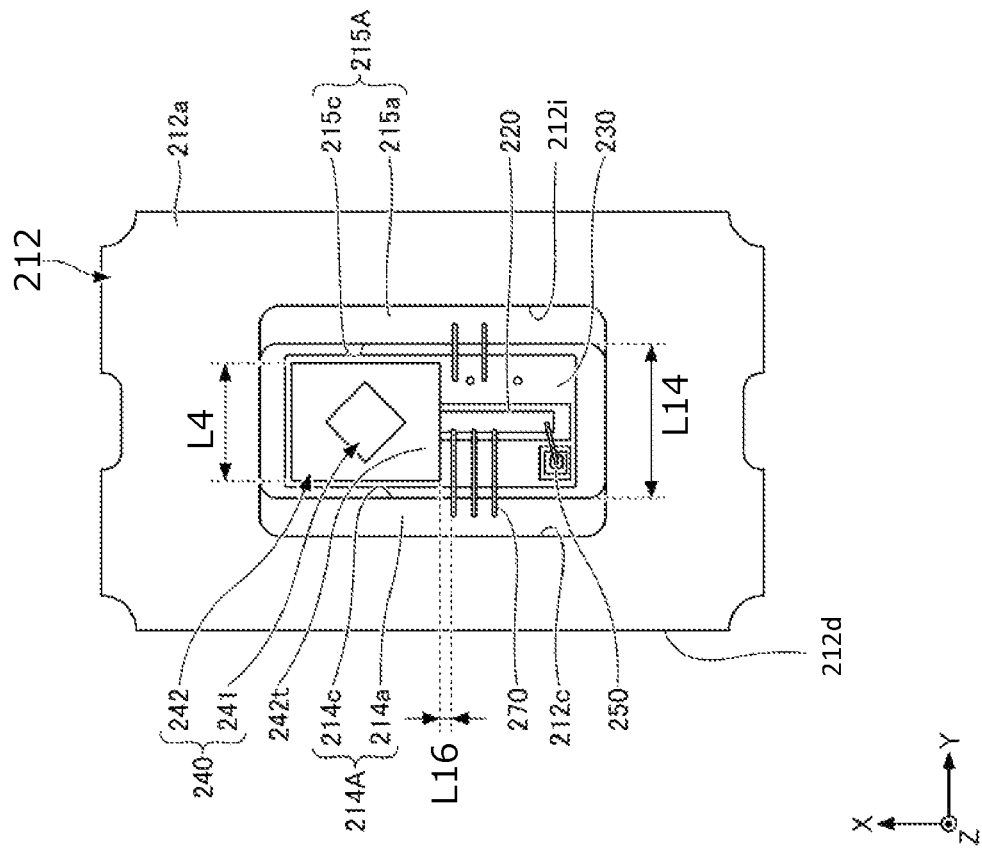
FIG. 22 is a schematic top view illustrating an internal structure of the light emitting device according to a fourth embodiment.
Figure 23:
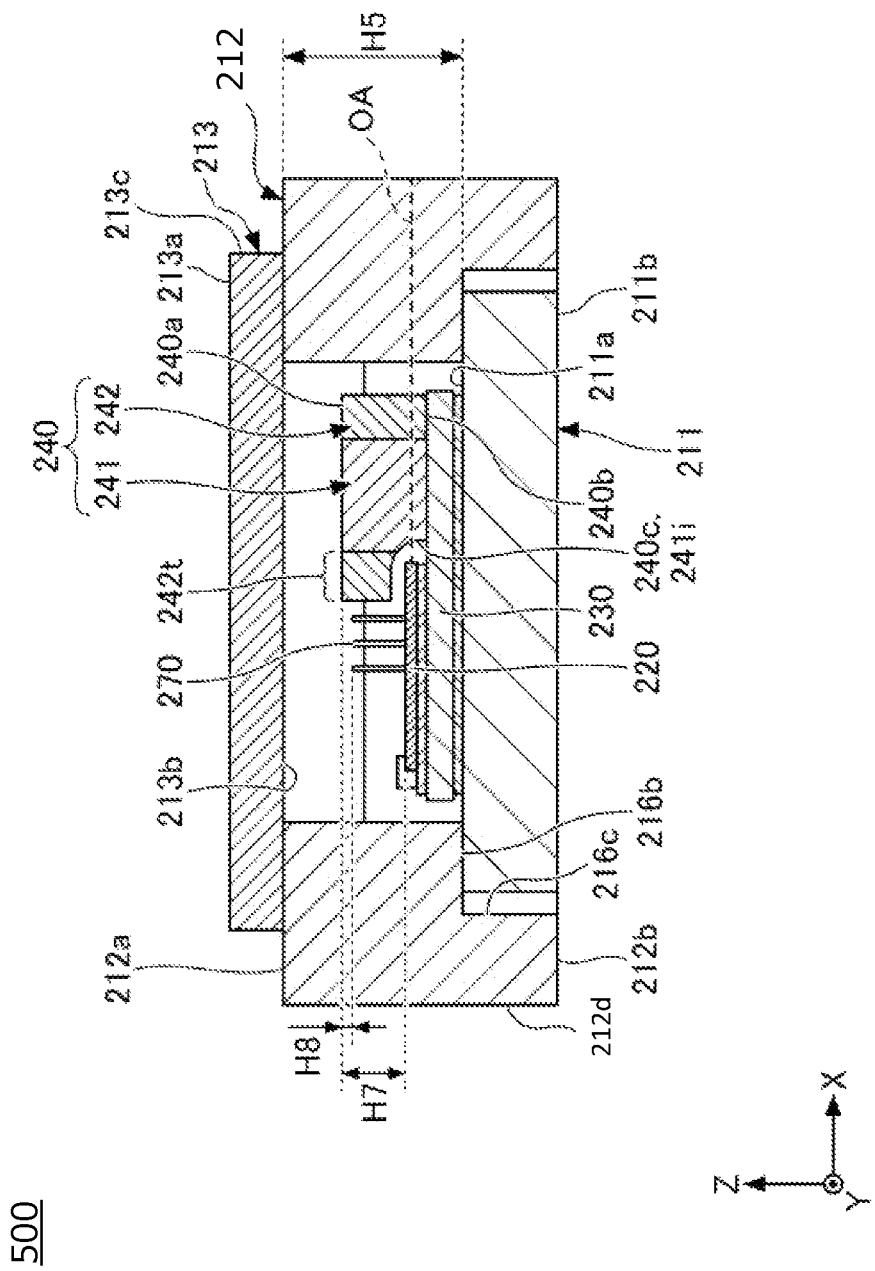
FIG. 23 is a schematic cross-sectional view taken along the line XXIII-XXIII in FIG. 1 and illustrating the light emitting device according to the fourth embodiment.
Figure 24:
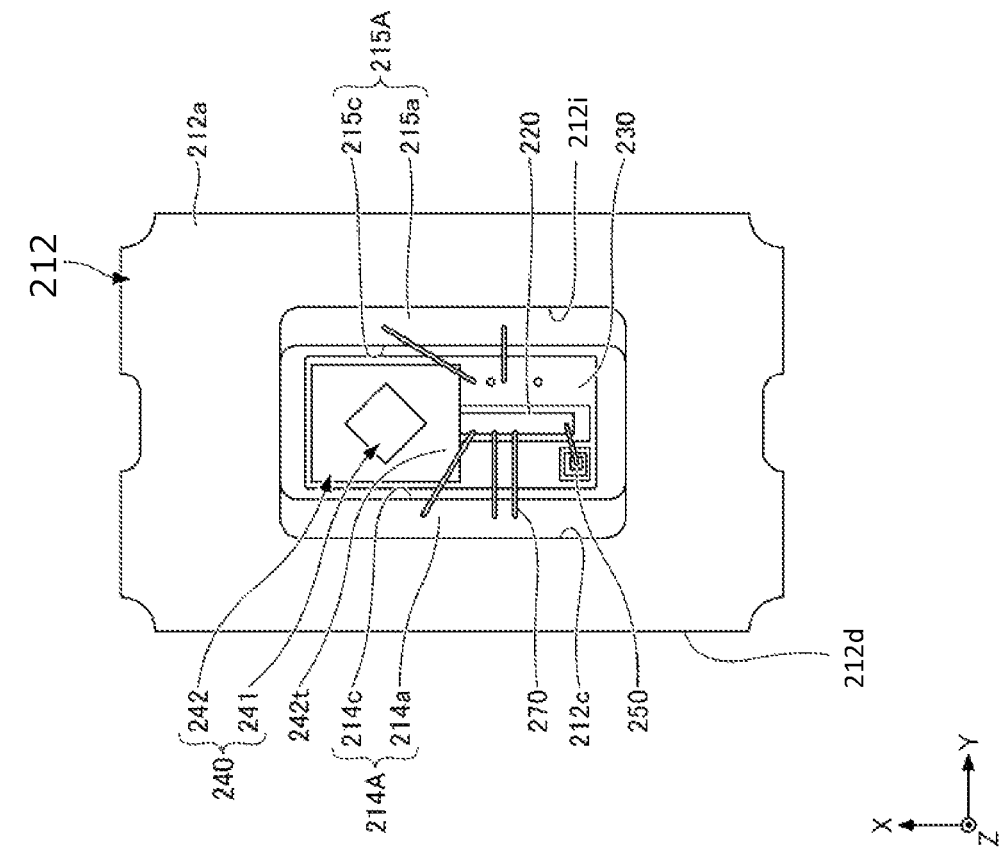
FIG. 24 is a schematic top view illustrating an internal structure of another example of the light emitting device according to the fourth embodiment.

With reference to FIG. 1 and FIGS. 22 to 24, a light emitting device 500 according to a fourth embodiment will be described below. FIG. 1 illustrates a schematic perspective view of the light emitting device 500 according to the fourth embodiment. FIG. 22 is a schematic top view illustrating an internal structure of the light emitting device according to the fourth embodiment. FIG. 23 is a schematic cross-sectional view taken along the line XXIII-XXIII in FIG. 1 and illustrating the light emitting device 500 according to the fourth embodiment. FIG. 24 is a schematic top view illustrating an internal structure of another example of the light emitting device 500 according to the fourth embodiment. In FIGS. 22 to 24, an X-axis, a Y-axis, and a Z-axis that are orthogonal to each other are illustrated for reference. In the present embodiment, directions parallel to the X, Y, and Z axes are defined as a X-axis direction, a Y-axis direction, and Z-axis direction, respectively. The X-axis direction and the Y-axis direction are parallel to the upper surface 211a of base member 211, and the Z-axis direction is perpendicular to the upper surface 211a of base member 211.

The light emitting device 500 according to the fourth embodiment differs from light emitting devices according to other embodiments in that the wiring 270 is bonded to a portion in the vicinity of the wavelength conversion member 240 in a top plan view. In the light emitting device 500 according to the present embodiment, for example, a package 210, a light emitting device 220, a submount 230, a wavelength conversion member 240, and a wiring 270 as those in the first embodiment can be used. Hereinafter, configurations different from those in the light emitting device 200 will be mainly described, and description of configurations same as those in the light emitting device 200 will be appropriately omitted.

Package 210

In the light emitting device 500 according to the present embodiment, a package same as the package 210 according to the first embodiment can be used. In the description of the present embodiment, two stepped portions will be illustrated separately as a first stepped portion 214A and a second stepped portion 215A. The first stepped portion 214A has an upper surface 214a and a lateral surface 214c. The second stepped portion 215A has an upper surface 215a and a lateral surface 215c. In the example shown in FIG. 22, the first stepped portion 214A is located at a side of the negative direction of the Y-axis direction with respect to the second stepped portion 215A. In the illustrated example, an inner lateral surface of the frame member 212 connected to the upper surface 212a and the upper surface 214a is referred to as a first inner lateral surface 212c, and an inner lateral surface of the frame member 212 that is connected to the upper surface 212a and the upper surface 215a is referred to as the second inner lateral surface 212i, thus distinguishing these inner lateral surfaces from each other.

Light Emitting Device 500

The light emitting element 220 and the wavelength conversion member 240 are located between the edge at which the lateral surface 214c and the upper surface 211a meet and the edge at which the lateral surface 215c and the upper surface 211a meet. As in the example illustrated in FIG. 22, the difference in the Y-axis direction between the length L4 of the wavelength conversion member and the length L14 between the lateral surface 214c and the lateral surface 215c of the frame member 212A may be set to 1000 μm or less. With the wavelength conversion member 240 having such a size, a size of the light emitting device 500 as a whole can be reduced.

In the example illustrated in FIG. 23, the light emitting element 220 and the wavelength conversion member 240 in the light emitting device 500 are disposed on one submount 230. The lower surface 240b of the wavelength conversion member 240 is bonded to the upper surface of the submount 230 via a bonding member.

The one or more wires 270 are bonded to the upper surface 214a of the first stepped portion 214A and/or the upper surface 215a of the second stepped portion 215A. In the Z-axis direction, a distance H7 between the upper surface 240a of the wavelength conversion member 240 and the upper surface of the light emitting element 220 is greater than the distance H8 between the upper surface 240a of the wavelength conversion member 240 and the top point of the wirings 270. Further, a height of the top point of the wirings 270 from the upper surface 211a of the base member 211 is greater than a height of the lower surface of the protrusion 242t of the wavelength conversion member 240 from the upper surface 211a of the base member 211. When bonding of the wires 270 is performed with its the uppermost point located at such a height, the movement of the wavelength conversion member 240 in the X-axis direction can be reduced even if the wavelength conversion member 240 falls off. In the illustrated example, further, the uppermost point of the wires 270 is positioned higher than the upper surface 214a and/or the upper surface 215a.

In the Z-axis direction, the distance from the upper surface 211a of the base member 211 to the uppermost point of the wires 270 is preferably longer than half of the distance H5 from the upper surface 211a to the lower surface 213b of the cover 213. In the illustrated example, the distance H8 is, for example, not less than 0.1 times and not more than 0.8 times the distance H7. More preferably, the distance H8 is less than or equal to 0.5 times the distance H7. Bonding the wires 270 in this manner allows for restricting the movement of the wavelength conversion member 240 in the X-axis direction. The distance H8 is, for example, −200 μm or more and 500 μm or less. Here, the minus value indicates that the uppermost point of the wires 270 is at a position higher than the upper surface 240a of the wavelength conversion member 240, and the plus value indicates that the uppermost point of the wires 270 is at a position lower than the upper surface 240a of the wavelength conversion member 240. That is, the uppermost point of the wires 270 is, for example, 200 μm or less above, and 500 μm or less below, the upper surface 240a of the wavelength conversion member 240.

Further, among the one or more wires 270 bonded to the upper surface of the light emitting element 220 in the top view, the wire 270 closest to the wavelength conversion member 240 in the X-axis direction is bonded to the upper surface 214a and/or the upper surface 215a on the light traveling direction side of the midpoint of the light emitting element 220 in the X-axis direction. Bonding the wires 270 in this manner allows for narrowing the range in which the wavelength conversion member 240 moves in the X-axis direction. In the illustrated example, at least one wire 270 among the plurality of wires 270 bonded to the upper surface 214a is bonded to the upper surface 214a on the light traveling direction side of the midpoint of the light emitting element 220. Among the plurality of wires 270 bonded to the upper surface 215a, at least one wire 270 is bonded to the upper surface 215a on the light traveling direction side of the midpoint of the light emitting element 220. The protective element 250 is disposed on the upper surface of the submount 230 further in the direction opposite to the light traveling direction with respect to the midpoint of the light emitting element 220 in.

The distance L16 from the end of the protrusion 242t of the wavelength conversion member 240 to the end of the wires 270 in the X-axis direction in the top view is preferably 50 μm or more and 1200 μm or less. With such a dimensional relationship, even when the wavelength conversion member 240 falls off the submount 230, the wires 270 block the end of the protrusion 242t of the wavelength conversion member 240, thereby restricting the movement of the wavelength conversion member 240 in the X-axis direction. For example, even when the wavelength conversion member 240 falls off the submount 230, the wavelength conversion member 240 can readily stay at such a position as to receive light from the light emitting element 220. As a result, the light emitted from the light emitting element 220 is less likely to exit directly from the light emitting device 500, which enables the realization of a highly safe light emitting device 500.

In the example shown in FIG. 24, the light emitting device 500 includes two wires 270, one bonded to the upper surface 214a of the first stepped portion 214A and the other bonded to the upper surface 215a of the second stepped portion 215A, on the light traveling direction side of the protrusion 242t. The two wirings 270 are bonded to the upper surfaces 214a and 215a such as to extend over the upper surface 240a of the wavelength conversion member 240 in the top view. Bonding the wires 270 to the upper surfaces 214a and 215a in this manner allows for reducing the movement of the wavelength conversion member 240 in the Z-axis direction.

In the Z-axis direction, the optical axis OA of the light emitted from the light emitting element 220 is preferably located below the point that is half the distance H5 from the upper surface 211a, i.e., half the distance between the upper surface 211a and the lower surface 213b as measured from the upper surface 211a of the base member 211.

For example, the light-emitting devices 200, 201, 300, and 301 can be used for vehicle headlights but are not limited thereto. The light-emitting devices 200, 201, 300, and 301 can also be used for light sources for lightings, projectors, head-mounted displays, backlights for other displays, or the like.

Preferable embodiments and the like have been described above in detail, but the embodiments and the like are not limiting. Change or replacement in a wide range can be carried out in the embodiments and the like within the scope specified by the claims.

What is claimed is:

1. A light-emitting device comprising:
a base member;
a light-emitting element disposed on or above an upper surface of the base member and configured to emit light traveling in a lateral direction; and
a wavelength conversion member disposed on or above the upper surface of the base member at a lateral side of the light-emitting element, the wavelength conversion member including
a wavelength conversion portion having an incident lateral surface and an exit surface so that light emitted from an emission end surface of the light-emitting element and traveling in the lateral direction is incident on the incident lateral surface, undergoes wavelength conversion in the wavelength conversion portion, and exits through the exit surface, and
a surrounding portion disposed around the wavelength conversion portion, the surrounding portion including a protrusion located above the light-emitting element, the protrusion protruding outwardly toward a light-emitting element side with respect to the incident lateral surface of the wavelength conversion portion with the protrusion overlapping with the emission end surface of the light-emitting element in a top view.

2. The light-emitting device according to claim 1, wherein the protrusion protrudes outwardly toward the light-emitting element side with respect to an end of a lower surface of the wavelength conversion member on the light-emitting element side.

3. The light-emitting device according to claim 1, wherein the exit surface of the wavelength conversion portion is located on an upper surface of the wavelength conversion member, and
light is emitted upward from the exit surface of the wavelength conversion member.

4. The light-emitting device according to claim 1, wherein the wavelength conversion portion has a first lateral surface and a second lateral surface with upper portions of the first lateral surface and the second lateral surface being connected to each other and lower portions of the first lateral surface and the second lateral surface being connected to the incident lateral surface of the wavelength conversion portion, and
the first lateral surface and the second lateral surface of the wavelength conversion portion are covered with the surrounding portion and not exposed, and
the incident lateral surface of the wavelength conversion portion is not covered with the surrounding portion and exposed.

5. The light-emitting device according to claim 1, wherein at least a portion of the incident lateral surface of the wavelength conversion portion is located below an optical axis of light emitted from the light-emitting element.

6. The light-emitting device according to claim 1, wherein the protrusion of the surrounding portion of the wavelength conversion member overlaps with the emission end surface of the light-emitting element in the top view.

7. The light-emitting device according to claim 1, wherein the protrusion of the surrounding portion of the wavelength conversion member overlaps with the entirety of the emission end surface of the light-emitting element in the top view.

8. The light-emitting device according to claim 1, wherein in the top view, in a direction parallel to an optical axis of light emitted from the light-emitting element, a length between a center of the wavelength conversion portion and a tip of the protrusion of the surrounding portion is greater than a length between the center of the wavelength conversion portion and an end of the surrounding portion opposite to the protrusion.

9. The light-emitting device according to claim 1, wherein a length between the emission end surface of the light-emitting element and a tip of the protrusion is 400 μm or less in a direction parallel to an optical axis of light emitted from the light-emitting element in the top view.

10. The light-emitting device according to claim 1, further comprising
wiring bonded to the light-emitting element on a side opposite to the wavelength conversion member with respect to a center of the light-emitting element in a top view.

11. The light-emitting device according to claim 1, further comprising
a submount having an upper surface on which the wavelength conversion member is disposed, wherein
an upper surface of the submount is not positioned higher than a lower surface of the light-emitting element.

12. The light-emitting device according to claim 11, wherein
the light-emitting element is disposed on or above the submount.

13. The light-emitting device according to claim 1, further comprising:
a frame member bonded to the base member and surrounding the light-emitting element and the wavelength conversion member;
a cover supported by the frame member and defining a sealed space accommodating the light-emitting element and the wavelength conversion member; and
a metal film on the cover, wherein
at least a portion of the metal film overlaps with the protrusion of the surrounding portion of the wavelength conversion member in the top view.

14. The light-emitting device according to claim 13, wherein
a lower surface of the cover has a light-transmissive region configured to transmit light emitted from the exit surface of the wavelength conversion portion of the wavelength conversion member,
the metal film is not provided in the light-transmissive region,
with respect to a virtual straight line connecting the emission end surface of the light-emitting element and an end of the protrusion of the surrounding portion of the wavelength conversion member in the top view,
the metal film is located on at least a side opposite to a direction of travel of light emitted from the emission end surface of the light-emitting element, and
the light-transmissive region is located on a side of the direction of travel of light.

15. A light-emitting device comprising:
a base member;
a light-emitting element disposed on or above an upper surface of the base member and configured to emit light traveling in a lateral direction;
a wavelength conversion member disposed on or above the upper surface of the base member at a lateral side of the light-emitting element, the wavelength conversion member including
a wavelength conversion portion having an incident lateral surface and an exit surface so that light emitted from an emission end surface of the light-emitting element and traveling in the lateral direction is incident on the incident lateral surface, and exits through the exit surface; and
a surrounding portion disposed around the wavelength conversion portion, the surrounding portion including a protrusion located above the light-emitting element, the protrusion protruding outwardly toward a light-emitting element side with respect to the incident lateral surface of the wavelength conversion portion; and
a light-transmissive member disposed above the wavelength conversion member, the light-transmissive member having
a light-shielding region provided with a light-shielding film, and
a light-transmissive region not provided with the light-shielding film,
the light-shielding film being located at a position through which a virtual line passes, the virtual line connecting an upper end of the emission end surface of the light-emitting element and an upper end of a lateral surface of the protrusion of the surrounding portion of the wavelength conversion member located closer to the light-emitting element than other lateral surfaces of the protrusion.

* * * * *